US008188912B1

(12) United States Patent
Weisenburger

(10) Patent No.: US 8,188,912 B1
(45) Date of Patent: May 29, 2012

(54) ALTITUDE CONSTRAINED GPS

(75) Inventor: Shawn D. Weisenburger, Mt. Pleasant (NZ)

(73) Assignee: Trimble Navigation Ltd., Sunnyvale, CA (US)

(*) Notice: Subject to any disclaimer, the term of this patent is extended or adjusted under 35 U.S.C. 154(b) by 261 days.

(21) Appl. No.: 12/586,954

(22) Filed: Sep. 29, 2009

(51) Int. Cl.
*G01S 19/41* (2010.01)

(52) U.S. Cl. .................................. 342/357.24

(58) Field of Classification Search ............. 342/357.28
See application file for complete search history.

(56) References Cited

U.S. PATENT DOCUMENTS

| | | | | |
|---|---|---|---|---|
| 5,617,317 A | * | 4/1997 | Ignagni | 701/215 |
| 6,055,477 A | * | 4/2000 | McBurney et al. | 701/207 |

OTHER PUBLICATIONS

Desbouvries, Jul. 17-20, 2005, IEEE, 2005 IEEE/SP 13th Workshop on Statistical Signal Processing, pp. 721-726.*
U.S. Standard Atmosphere, 1976, U.S. Government Printing Office, Washington, D.C., 1976, available http://www.pdas.com/refs/us76.pdf.
B. McDavitt, "How to Read a Barometer", www.metservice.com, Jan. 2007, available http://vaac.metservice.com/default/index.php?alias=month_feature_jan_2007.
H. Liu and G. L. Darkow, "Wind Effect on Measured Atmospheric Pressure", in Journal of Atmospheric and Oceanic Technology, Feb. 1989, vol. 6, No. 1.
SCP1000 Series Datasheet, VTI Technologies Oy, Aug. 28, 2007, available http://www.vti.fi/midcomserveattachmentguid 9cbae6a382efd245cb62354a54ff62c7/scp1000 d01_d11_pressure_sensor_datasheet_28-08-2007.pdf.
SCP1000 Series Product Family Specification, VTI Technologies Oy, rev. 0.08, availablehttp://www.vti.fi/midcomserveattachmentguid 30de88ec8eb89a476cb8c8e70b969dc3/scp1000_product_family_specification_rev_0.08.pdf.
R. G. Brown and P. Y. C. Hwang, Introduction to Random Signals and Applied Kalman Filtering, 2nd ed., Wiley, 1992, pp. 342-349.
R. G. Brown and P. Y. C. Hwang, Introduction to Random Signals and Applied Kalman Filtering, 2nd ed., Wiley, 1992, pp. 330-351.

* cited by examiner

*Primary Examiner* — Harry Liu
(74) *Attorney, Agent, or Firm* — Boris G. Tankhilevich

(57) ABSTRACT

A method of improving accuracy of position coordinates of a positioning device is provided. The method comprises: (A) obtaining a 3D reference solution for reference position coordinates of an positioning device by using a plurality of available radio signals emanating from an integer N number of available radio sources at time t; wherein 3D solution includes a reference 3D altitude of said positioning device at Epoch (t); (B) obtaining a barometric altitude of the positioning device at each Epoch; (C) if a trigger event occurs at Epoch (t+1), generating an updated altitude of the positioning device at Epoch (t+1) by using the reference 3D altitude obtained at Epoch (t) and by using the barometric altitude obtained at Epoch (t) and obtained at Epoch (t+1); and (D) using a position estimator to obtain 3D solution for position coordinates of the positioning device at Epoch (t+1) with improved accuracy by utilizing the updated altitude of the positioning device.

35 Claims, 6 Drawing Sheets

ALTITUDE CONSTRAINED GPS

The technology relates to the field of satellite navigation and positioning.

BACKGROUND

Under normal circumstances, a Global Navigation Satellite System receiver (GPS or a receiver configured to operate in combination with other systems such as GLONASS) requires a minimum of four satellites to obtain a position estimate. Due to obstructions such as buildings and trees, satellite (SV) visibility, geometry, and signal quality may degrade. In these conditions, the accuracy of GPS positions will typically decrease, until they are unavailable.

This happens when there are either insufficient satellites (three or less), or the conditions become so bad that they fall below some threshold set by the user.

If one of the four GPS variables (three position axes, x, y, and z, and receiver clock error) is known however, the solution process can be modified to solve for only three variables—the minimum number of required satellites becomes only three, and in the case of bad conditions, the extra constraint may allow better accuracy in the other three measurements. Commonly used constraints and measurement methods include acceleration (accelerometer), heading (gyroscope), and altitude (barometric altimeter).

Herein is described the use of a barometer to augment obtaining improved position fixes in GNSS receivers, as well as improving the availability thereof under degrading conditions caused by multipath, limited satellite visibility, and poor satellite geometric conditions.

Experiments with suitable GNSS receivers and a barometric altimeter have shown that improvements in the yield of acceptable position fixes can be obtained. In all cases, the prototype results were much more accurate than those obtained using an unaided off-the-shelf GPS receiver. With differential barometry, useful lifetime of the constraint can be extended to entire data collection sessions, with submeter accuracy achievable for averaged features.

SUMMARY

This Summary is provided to introduce a selection of concepts that are further described below in the Detailed Description. This Summary is not intended to identify key or essential features of the claimed subject matter, nor is it intended to be used as an aid in determining the scope of the claimed subject matter.

A method of improving accuracy of position coordinates of a positioning device employing a radio receiver is provided. The method comprises: (A) obtaining a 3D reference solution for reference position coordinates of a positioning device by using a plurality of available radio signals emanating from an integer N number of available radio sources at time t; wherein 3D solution includes a reference 3D altitude of said positioning device at Epoch (t); (B) obtaining a barometric altitude of the positioning device at each Epoch; (C) if a trigger event occurs at Epoch (t+1), generating an updated altitude of the positioning device at Epoch (t+1) by using the reference 3D altitude obtained at Epoch (t) and by using the barometric altitude obtained at Epoch (t) and obtained at Epoch (t+1); and (D) using a position estimator to obtain 3D solution for position coordinates of the positioning device at Epoch (t+1) with improved accuracy by utilizing the updated altitude of the positioning device.

DESCRIPTION OF THE DRAWINGS

The accompanying drawings, which are incorporated in and form a part of this specification, illustrate embodiments of the technology and, together with the description, serve to explain the principles below.

DETAILED DESCRIPTION

Figure 1:
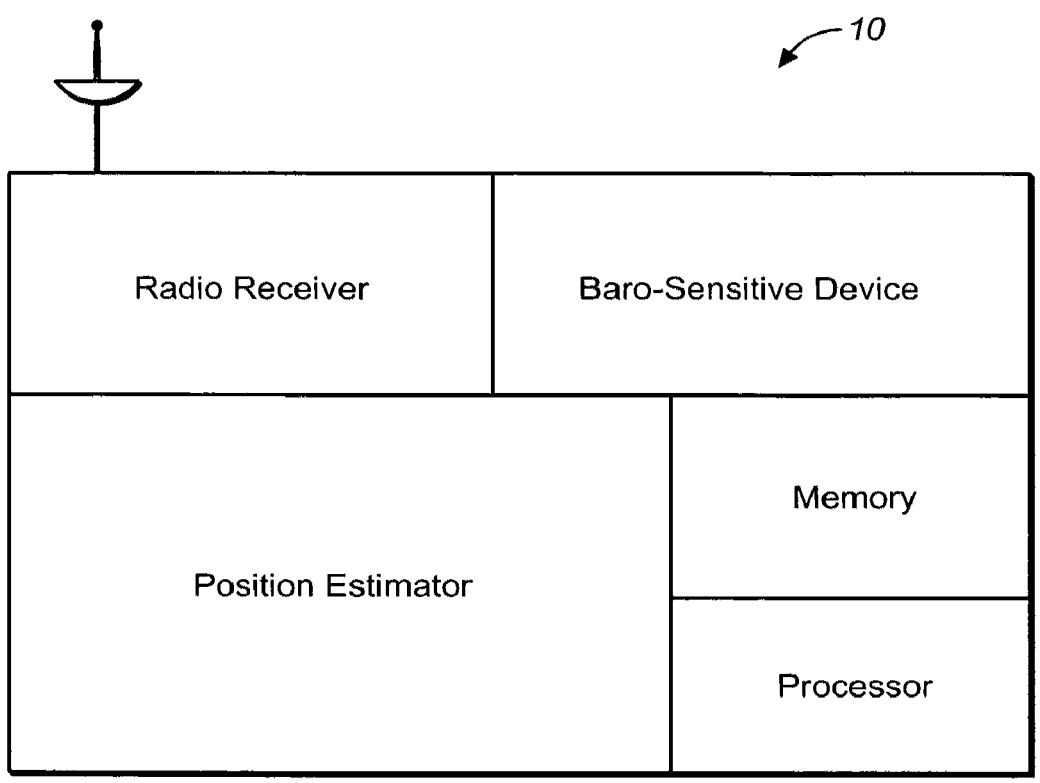
FIG. 1 depicts a block diagram of the apparatus of the present technology.

Reference now be made in detail to the embodiments of the technology, examples of which are illustrated in the accompanying drawings.

While the present technology will be described in conjunction with the various embodiments, it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific-details are set forth in order to provide a thorough understanding of the presented embodiments. However, it will be obvious to one of ordinary skill in the art that the presented embodiments may be practiced without these specific details. In other instances, well known methods, procedures, components, and circuits have not been described in detail as not to unnecessarily obscure aspects of the presented embodiments. A variety of positioning receivers and associated delivery systems exist; the Global Navigation Satellite System (GNSS) describes any of the satellite positioning systems, including the Global Positioning System (GPS), GLONASS, Compass, or Galileo, either separately or in combination.

GPS receivers were first, and when referred to herein, include GPS as well as any of the other systems, separately or in combination.

In an embodiment of the technology, a method of improving accuracy of position coordinates of an positioning device employing a radio receiver comprises (not shown): (A) obtaining a 3D reference solution for reference position coordinates of the positioning device by using a plurality of available radio signals emanating from an integer N number of available radio sources at time t; wherein 3D solution includes a reference 3D altitude of the positioning device at Epoch (t); (B) obtaining a barometric altitude of the positioning device at each Epoch; (C) if a trigger event occurs at Epoch (t+1), generating an updated altitude of the positioning device at Epoch (t+1) by using the reference 3D altitude obtained at Epoch (t) and by using the barometric altitude obtained at Epoch (t) and obtained at Epoch (t+1); and (D) using a position estimator to obtain 3D solution for position coordinates of the positioning device at Epoch (t+1) with improved accuracy by utilizing the updated altitude of the positioning device.

In an embodiment of the technology, the step (A) further comprises: (A1) selecting an integer N number of available radio sources from the group consisting of: {GPS; GLONASS; combined GPS/GLONASS; GALILEO; and COMPASS}.

The Global Positioning System (GPS) is a system of satellite signal transmitters that transmits information from which an observer's present location and/or the time of observation can be determined. The GPS was developed by the United States Department of Defense (DOD) under its NAVSTAR satellite program.

A fully operational GPS includes more than 24 Earth orbiting satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Generally, four or more GPS satellites will be visible from most points on the Earth's surface, which can be used to determine an observer's position anywhere on the Earth's surface. Each satellite carries a cesium or rubidium atomic clock to provide timing information for the signals transmitted by the satellites. An internal clock correction is provided for each satellite clock.

Each GPS satellite continuously transmits two spread spectrums, L-band carrier signals: an L1 signal having a frequency f1=1575.42 MHz (approximately nineteen centimeter carrier wavelength) and an L2 signal having a frequency f2=1227.6 MHz (approximately twenty-four centimeter carrier wavelength). These two frequencies are integral multiplies f1=1,540 f0 and f2=1,200 f0 of a base frequency f0=1.023 MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes and accepted methods for generating the C/A-code and P-code are set forth in the document ICD-GPS-200: GPS Interface Control Document, ARINC Research, 1997, GPS Joint Program Office, which is incorporated by reference herein.

The GPS satellite bit stream includes navigational information on the ephemeris of the transmitting GPS satellite (which includes orbital information about the transmitting satellite within next several hours of transmission) and an almanac for all GPS satellites (which includes less detailed orbital information about all satellites). The transmitted satellite information also includes parameters providing corrections for ionospheric signal propagation delays (suitable for single frequency receivers) and for an offset time between satellite clock time and true GPS time. The navigational information is transmitted at a rate of 50 Baud.

A second satellite-based navigation system is the Global Orbiting Navigation Satellite System (GLONASS), placed in orbit by the former Soviet Union and now maintained by the Russian Republic. GLONASS uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS satellites have circular orbits with radii of about 25,510 kilometers and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1= (1.602+9k/16) GHz and f2=(1.246+7k/16) GHz, where k=(1, 2, 24) is the channel or satellite number. These frequencies lay in two bands at 1.597-1.617 GHz (L1) and 1,240-1,260 GHz (L2). The L1 signal is modulated by a C/A-code (chip rate=0.511 MHz) and by a P-code (chip rate=5.11 MHz). The L2 signal is presently modulated only by the P-code. The GLONASS satellites also transmit navigational data at a rate of 50 Baud. Because the channel frequencies are distinguishable from each other, the P-code is the same, and the C/A-code is the same, for each satellite. The methods for receiving and demodulating the GLONASS signals are similar to the methods used for the GPS signals.

As disclosed in the European Commission "White Paper on European transport policy for 2010", the European Union will develop an independent satellite navigation system GALILEO as a part of a global navigation satellite infrastructure (GNSS). The GALILEO system is based on a constellation of 30 satellites and ground stations providing information concerning the positioning of users in many sectors such as transport (vehicle location, route searching, speed control, guidance systems, etc.), social services (e.g. aid for the disabled or elderly), the justice system and customs services (location of suspects, border controls), public works (geographical information systems), search and rescue systems, or leisure (direction-finding at sea or in the mountains, etc.).

China has launched its own satellite navigation system—Beidou Navigation System by launching initially satellites Beidou 1B and Beidou 2A. The latest Beidou navigation satellite was successfully launched on 3 Feb. 2007. Till 2007, the resolution of Beidou navigation system already reached as high as 0.5 m, thus China became the second country after USA which achieved <1 m resolution.

In an embodiment of the present technology, a baro measurement of an altitude of a positioning device at each Epoch is obtained by using a baro-sensitive device selected from the group consisting of: {a barometric altimeter; and a differential barometer}.

In an embodiment of the present technology, a barometric altimeter used for this project was the VTI SCP1000 MEMS pressure sensor, manufactured by VTI Technologies, Inc., located at Pasadena, Calif. 91101, USA.

In an embodiment of the present technology, the sensor package is also configured to measure temperature.

In an embodiment of the present technology, a trigger event warranties usage of baro measurement(s) configured to improve the accuracy of position coordinates of a positioning device 10 (of FIG. 1).

In an embodiment of the present technology, the logical statement #1: "a certain integer number N of available radio sources is less than a predetermined number $N_{threshold}$" represents a trigger event.

In an embodiment of the present technology, the logical statement #2: "a constellation of available satellite radio sources changed due to drop out of at least one satellite and its replacement by at least one another satellite" represents a trigger event.

In an embodiment of the present technology, the logical statement #3: "a dilution of precision (DOP) is greater than a predetermined threshold $DOP_{threshold}$" represents a trigger event.

In an embodiment of the present technology, DOP is selected from the group consisting of: {a vertical dilution of precision (VDOP); a positional dilution of precision (3D) (PDOP); a temporal dilution of precision (TDOP); and combination of VDOP, PDOP, and TDOP}.

In an embodiment of the present technology, if at time t+1 a trigger event occurs, a new altitude can be generated from the equation:

Altitude(t+1)=3D_Altitude(t)+BaroAltitude(t+1)−BaroAltitude(t);

where the 3-D solution is obtained at time t; the barometric altitude is also obtained at time t. This Altitude (t+1) is then fed into the position estimator along with any other available measurements (from radio sources). If the trigger does not occur, the 3D position at t+1 becomes the reference position and the barometric altitude becomes the new reference barometric altitude.

In an embodiment of the present technology, a position estimator is implemented by using a Bias Filter Model. In this embodiment of the present technology, the position estimator utilizes an altitude sensor Kalman filter and a bias master Kalman filter. Each new altitude is used to update and project the altitude Kalman filter. The bias Kalman filter is projected to provide a continuous estimate of the barometric altitude bias.

In an embodiment of the present technology, a position estimator is implemented by using a Differential Filter Model; wherein barometric altitude is used as a differential altimeter; and wherein pseudo derivative of barometric altitude is calculated and injected into a master Kalman filter as a rate measurement.

In an embodiment of the present technology, a position estimator is implemented by using a Three-State Altitude Filter Model; wherein the position estimator utilizes a combined altitude and velocity three-state Kalman filter.

In an embodiment of the present technology, a position estimator is implemented by using backward-smoothing of filter estimates, wherein the backward-smoothing is implemented by using a Fraser & Potter algorithm.

In an embodiment of the present technology, a position estimator is implemented by using backward-smoothing of filter estimates, wherein the backward-smoothing is implemented by using a Rauch, Tung, & Striebel (RTS) algorithm.

In an embodiment of the present technology, a position estimator is implemented by using a Three-State Altitude Filter Model; wherein the position estimator utilizes a combined altitude and velocity three-state Kalman filter; wherein the plurality of available radio sources is configured to provide an absolute range reference and Doppler velocities, and wherein the set of differential baro corrections data is configured to provide an extra vertical velocity data.

Barometric Altitude Estimation.

A common method of measuring altitude is by using barometry. The relationship between atmospheric pressure P and altitude H above sea level is given by the 1976 US standard. (Please, see *U.S. Standard Atmosphere*, 1976, U.S. Government Printing Office, Washington, D.C., 1976) as:

$$P = P_b \cdot \left[\frac{T_{M,b}}{T_{M,b} + L_{M,b} \cdot (H - H_b)}\right]^{\left[\frac{g'_0 \cdot M_0}{R^* \cdot L_{M,b}}\right]} \quad \text{(Eq. 1)}$$

For ground level applications (under approximately 11 km, b=0), the relevant constants are
$P_0$=1.013250×10$^5$ Pa
$T_{M,0}$=288.15K
$L_{M,0}$=−6.5×10$^{-3}$K m$^{-1}$
$H_0$=0 m
$g'_0$=9.80665 m s$^{-2}$
$M_0$=2.89644×10$^{-2}$ kg mol$^{-1}$
$R^*$=8.31432 N m mol$^{-1}$ K$^{-1}$ Rearranged, this gives an altitude-pressure relation:

$$H = \frac{T_{M,0}}{L_{M,0}} \cdot \left[\left(\frac{P}{P_0}\right)^{\left(\frac{R^* \cdot L_{M,0}}{g'_0 \cdot M_0}\right)} - 1\right] \quad \text{(Eq. 2)}$$

This equation is only really useful for ideal conditions. The defined $M_0$ is for dry air, so some slight variations are to be expected when humidity changes. Diurnal barometric pressure cycles and changing weather patterns will cause variations in the barometric pressure. Please, see *U.S. Standard Atmosphere*, 1976, U.S. Government Printing Office, Washington, D.C., 1976.

In general, the effect of wind on pressure measurements around an obstacle is given by $$P = P_a + \frac{1}{2} C_p \cdot \rho \cdot V^2 \quad \text{(Eq. 3)}$$

Where $P_a$ is the ambient (static) pressure, $C_p$ is some geometrical coefficient for the obstruction, $\rho$ is the mean density of the air, and V is what would be the unobstructed wind velocity. For typical values of $\rho$=1.2 kg m$^{-3}$, $C_p$=0.6 (for flat outside walls), and a moderate breeze on the Beaufort scale (V=8 m s$^{-1}$), the error P−$P_a$ is approximately 23 Pa, or an equivalent altitude error of nearly 2 m around sea level.

If wind is directly forced into an opening in an otherwise relatively well sealed enclosure; the rammed air will cause a significant increase in pressure inside the enclosure. Even if there is no direct opening, but only small gaps for ventilation (i.e. a non-hermetic seal), the pressure changes caused by wind around the outside of the enclosure will affect the pressure inside the enclosure.

Unfortunately this is much more difficult to predict, since it depends on the geometry of the openings in relation to the wind.

Sensor Characterization. The conclusions leading to the details herein were obtained using a prototype consisting of a baro pressure sensor, a weather board, and an assembly. The barometric pressure sensor used for this project was the VTI SCP1000 MEMS pressure sensor, manufactured by VTI Technologies, Inc., located at Pasadena, Calif. 91101, USA. It allows a maximum resolution of 1.5 Pa (in high resolution mode), which equates to approximately 10 cm of altitude resolution at ground level. Various measurement rates are supported. The sensor typically has a large absolute pressure error, but has good relative accuracy. Please, see *U.S. Standard Atmosphere*, 1976, U.S. Government Printing Office, Washington, D.C., 1976; and B. McDavitt, *How to Read a Barometer*, available at http://www.metservice.com/default/staticpages/downloads/howtoreadbaro.pdf.

The sensor package is also configured to measure temperature.

VTI Technologies claims it features internal temperature compensation, so temperature effects are probably negligible. For the prototype, a pre-assembled USB weather board from SparkFun Electronics located at Boulder, Colo., USA, with an onboard SCP1000 was used (FIG. 1, arrow 10). Please, see SCP1000 Series Datasheet, VTI Technologies Oy, 28 Aug. 2007, available http://www.vti.fi/midcom-serveattachmentguid-9cbae6a382efd245cb62354a54ff    2c7/ scp1000-d01_-d11_pressure_sensor_datasheet_28-08-2007.pdf and, also please see *SCP1000 Series Product Family Specification*, VTI Technologies Oy, rev. 0.08, available http://www.vti.fi/midcom-serveattachmentguid-30de88ec8eb89a476cb8c8e70b99dc3/scp1000_product_family_specification_rev_0.08.pdf The sensor package provides a pre-existing USB interface for logging sensor data. Due to the firmware of the USB weather board, measurements are limited to 1 Hz, with a maximum possible lag of 1 second between measurement and logging. The high resolution measurement mode of the SCP1000 is used.

Prototype Description, Data Collection System

GPS and barometric data were collected using a 2005 series GeoXH unit with ProGeo v1.82 firmware for the receiver. A USB dongle was used to connect the sensor box to the GeoXH, forming an integrated GPS/barometric data gathering system. Both sets of data were logged using TSIP Status to SSF format for post-processing. Sensor data was logged at 1 Hz, with GPS measurements logged at the same rate (if available).

Figure 2:
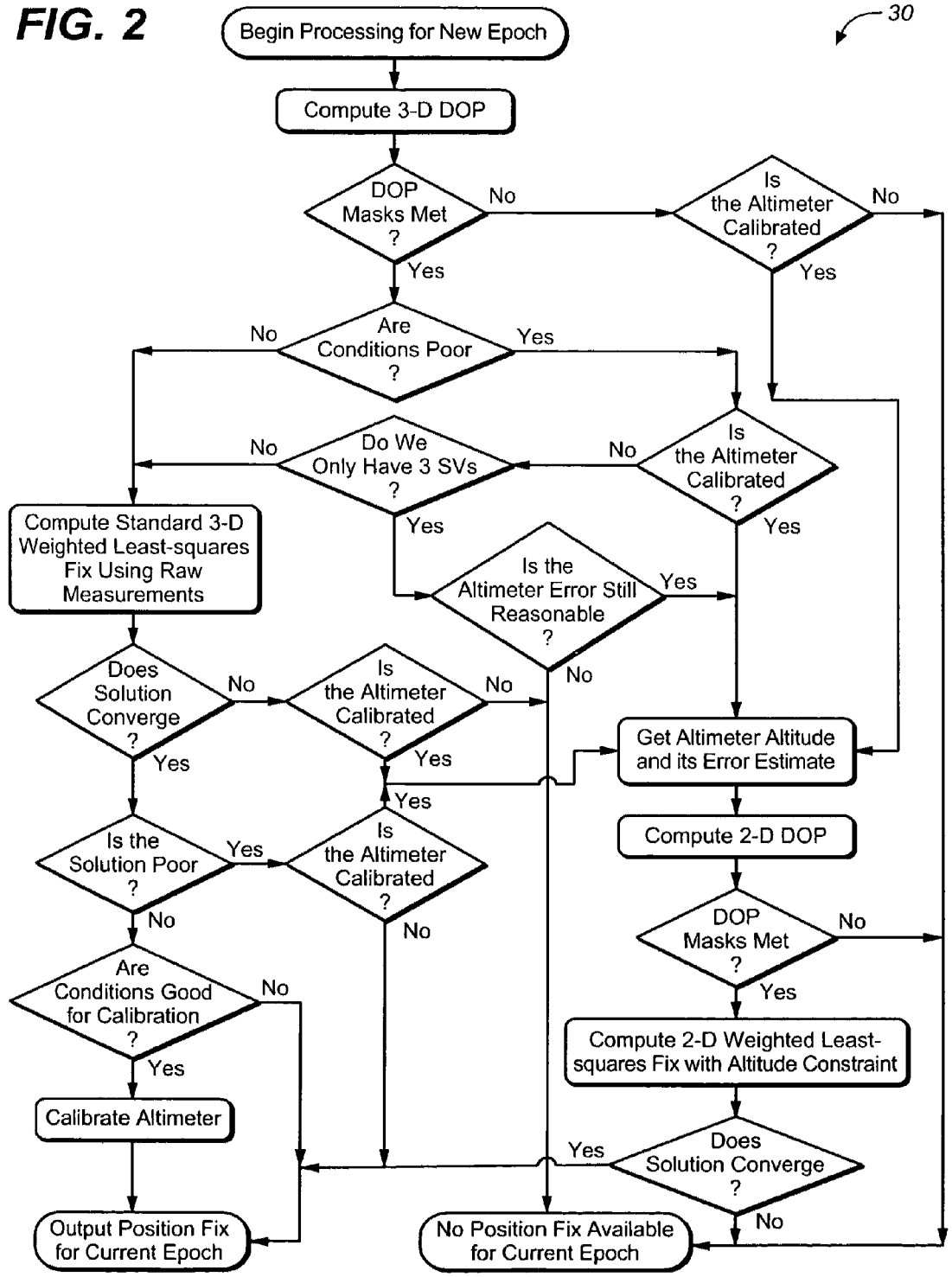
FIG. 2 is a diagram of a flow chart showing the simplified algorithm for the barometrically augmented Maximum Correlation (MCORR) algorithm.

A suitable algorithm is used to process the data in real time. The algorithm for the augmented Maximum Correlation (MCORR) engine is shown in FIG. 2 (arrow 30). According to this algorithm, the position correction cycle thus described occurs for every observation Epoch in which there is sufficient pseudo range measurements recorded in the SSF file. The process for a session is forward-pass only, in that it only has knowledge of current data and past history in the form of internal states. In this respect, they may be adapted for real-time implementation in a receiver.

There are many parameters that govern how the barometric altitude constraints are to be integrated with the standard GPS correction algorithm. As an example, they were derived experimentally to deliver robust and reliable results instead of maximizing yield. The barometric altitude constraint may be used if the conditions are poor enough. This is governed by a set of thresholds looking at mean signal to noise ratio (SNR) (of the satellites that meet the standard SNR mask), PDOP, and SV count (Table 1).

TABLE 1

Standard conditions for which an altitude constraint is preferred

| Minimum mean SNR | Maximum PDOP | Minimum SV count |
|---|---|---|
| 38 dB Hz | 5.0 | 4 |

A similar set of thresholds is used to determine when the GPS altitude fix is good enough to calibrate the barometric altimeter (Table 2).

TABLE 2

Conditions for which the 3-D fix is good enough for calibration

| Minimum mean SNR | Maximum PDOP | Minimum SV count |
|---|---|---|
| 40 dB Hz | 6.0 | 5 |

The barometric altitude constraint will only be used if it is considered to be calibrated. This is controlled by the error tolerance parameters shown in Table 3. Initially, a minimum number of good GPS measurements are required. The altimeter is considered calibrated when either its variance estimate is below a certain threshold, or the barometric altitude has not drifted from the last known (calibrated with GPS) altitude by a set amount.

Two variance thresholds exist; one for more than 3 SVs (with which a GPS-only solution is possible), and a more lenient one for cases with only 3 SVs, (with which a GPS-only solution is not possible). The drift constraint is designed so that on flat ground and in good weather (i.e. low bias drift), the altimeter can still be used despite exceeding initial error thresholds. If the altimeter is calibrated, and conditions were deemed good enough for 3-D fix, but if either the solution does not converge or the vertical error estimate is larger than 1.5 m, the position for the Epoch is recomputed using 2-D constrained least-squares (Table 3.)

TABLE 3

Conditions for altimeter calibration

| Initial GPS calibration measurements required | Drift allowed between altitude estimate and last calibration | Variance in altitude estimate allowed with SV count above 3 | Variance in altitude estimate allowed when SV count is 3 |
|---|---|---|---|
| 5 | 1.5 m | 4 m$^2$ | 16 m$^2$ |

A 'pruning' step, where constrained positions with greater than 1 m of error in the semi major axis of the error ellipse are removed after correction, was also tested. It was hoped that this would result in more accurate constrained positions (at a cost of reduced yield increases).

The barometric sensor has two main sources of error (as outlined earlier):
(i) Barometric sensor noise
(ii) Barometric altitude bias and bias drift Kalman filters are used to reduce the effects of these error sources. Details of the various filter architectures explored are outlined in the following sections.

Bias Filter Model

Figure 3:
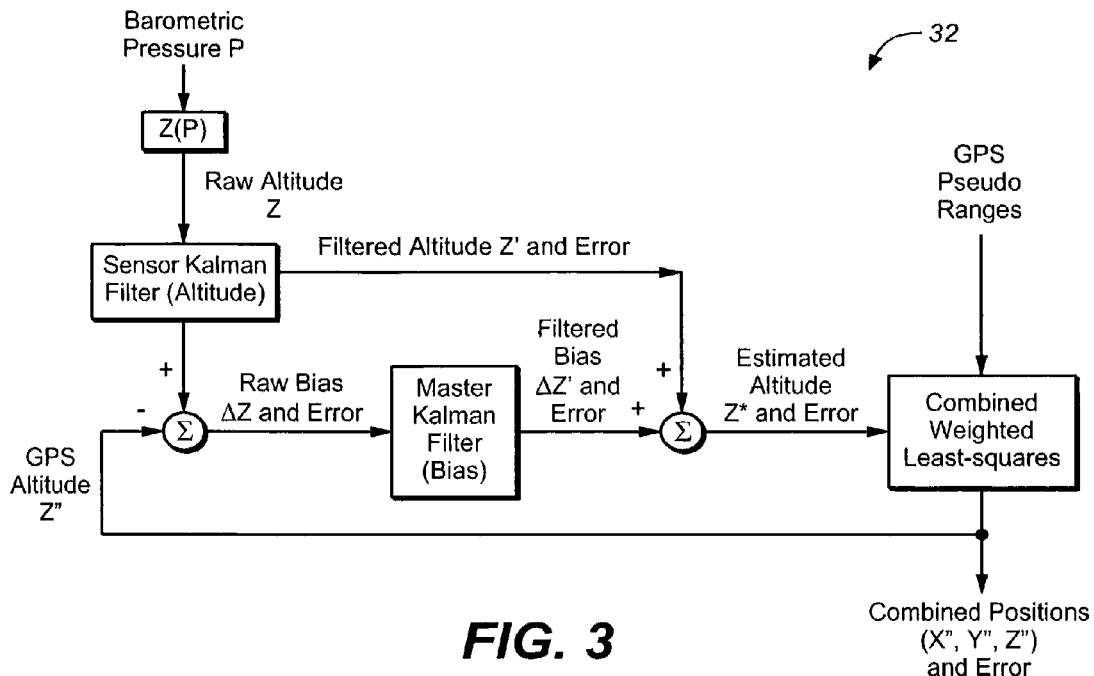
FIG. 3 illustrates a high level overview of the decentralized, cascaded filter architecture used for barometric altitude aided GPS correction.

The first integrated barometric altitude aided GPS correction scheme utilizes a type of decentralized, cascaded filter architecture that models barometric altitude bias. (FIG. 3, arrow 32). The raw barometric pressure is read from the SSF file and converted to a raw altitude. Each new altitude is used to update and project the altitude Kalman filter. At the same time, the bias Kalman filter is also projected to provide a continuous estimate of the barometric altitude bias. When good GPS altitudes are available during the correction process, the bias filter is also updated with the actual bias measurement in order to maintain reasonable calibration.

The converted barometric altitude and the altitude bias were modeled as integrated Gauss-Markov processes. Two independent, two-state Kalman filters for the altitude and bias were developed using the Gauss-Markov model. The Gauss-Markov model gives the Kalman Filter parameters:

$$\Phi = \begin{bmatrix} 1 & \tau \cdot (1 - e^{-\Delta t/\tau}) \\ 0 & e^{-\Delta t/\tau} \end{bmatrix} \quad \text{(Eq. 4)}$$

$$Q = A + B + C + D \quad \text{(Eq. 5)}$$

Where $$A = \begin{bmatrix} \tau\sigma^2[2\Delta t + \tau(4e^{-\Delta t/\tau} - e^{-2\Delta t/\tau} - 3)] & 0 \\ 0 & 0 \end{bmatrix}$$

-continued $$B = \begin{bmatrix} 0 & \tau \cdot \sigma^2 \cdot (1 - 2 \cdot e^{-\Delta t/\tau} + e^{-2 \cdot \Delta t/\tau}) \\ 0 & 0 \end{bmatrix}$$

$$C = \begin{bmatrix} 0 & 0 \\ \tau \cdot \sigma^2 \cdot (1 - 2 \cdot e^{-\Delta t/\tau} + e^{-2\Delta t/\tau}) & 0 \end{bmatrix}$$

$$D = \begin{bmatrix} 0 & 0 \\ 0 & \sigma^2 \cdot (1 - e^{-2\cdot\Delta t/\tau}) \end{bmatrix}$$

The single measurement has equations $$H=[1\ 0] \tag{Eq. 6}$$

$$R=[\upsilon] \tag{Eq. 7}$$

and is either the bias or the raw sensor altitude (of the corresponding filter).

Table 4 shows experimentally derived parameters used for the sensor filters.

TABLE 4

Kalman filter parameters for barometric sensor altitude and altitude bias

| Model Parameter | Sensor (altitude) | Master (bias) |
|---|---|---|
| Correlation time $\tau$ (s) | 2 | 60 |
| Model variance $\sigma^2$ (m² s⁻²) | 0.0064 | 0.0009 |
| Measurement variance $\upsilon$ (m²) | 0.09 | 0.81 |

Differential Filter Model

Figure 4:
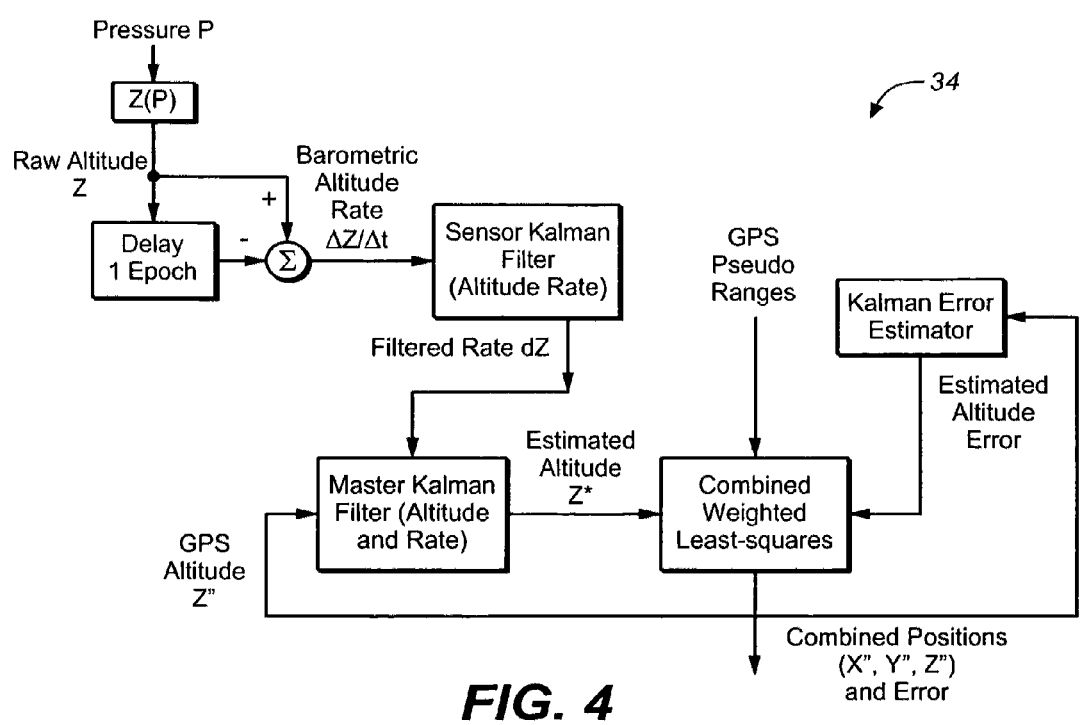
FIG. 4 depicts differential filter architecture.

An alternative integration scheme based on using GPS as the absolute altitude measure and the barometer as the differential altitude measure was also explored. (FIG. 4, arrow 34). This architecture uses the barometer purely as a differential altimeter. The pseudo derivative of barometric altitude is calculated, and injected into the master Kalman filter as a rate measurement. The master filter remains the same integrated Gauss-Markov filter, with additional update equations for altitude rate $$H=[0\ 1] \tag{Eq. 8}$$

$$R=[\upsilon] \tag{Eq. 9}$$

The model parameters used are shown in Table 5

TABLE 5

Kalman filter parameters for the differential filter architecture

| Model Parameter | Sensor (altitude rate) | Master (altitude) |
|---|---|---|
| Correlation time $\tau$ (s) | 2 | 200 |
| Model variance $\sigma^2$ (m² s⁻²) | 0.0064 | 0.09 |
| Measurement variance $\upsilon$ (m²) | 0.09 | 0.81 |
| Rate measurement variance $\upsilon$ (m² s⁻²) | N/A | 0.06 |

This scheme uses an incorrect model, in that there is no modeling of the barometric bias drift. This means that the error estimates given by the filter do not reflect potential drift errors. Thus, an additional Kalman filter is run in parallel to produce error estimations. It is identical to the bias filter described earlier, except that it is never updated with real data (only dummy zeroes). Its only purpose is to serve as an error estimator for the master filter.

Three-State Altitude Filter Model

Figure 5:
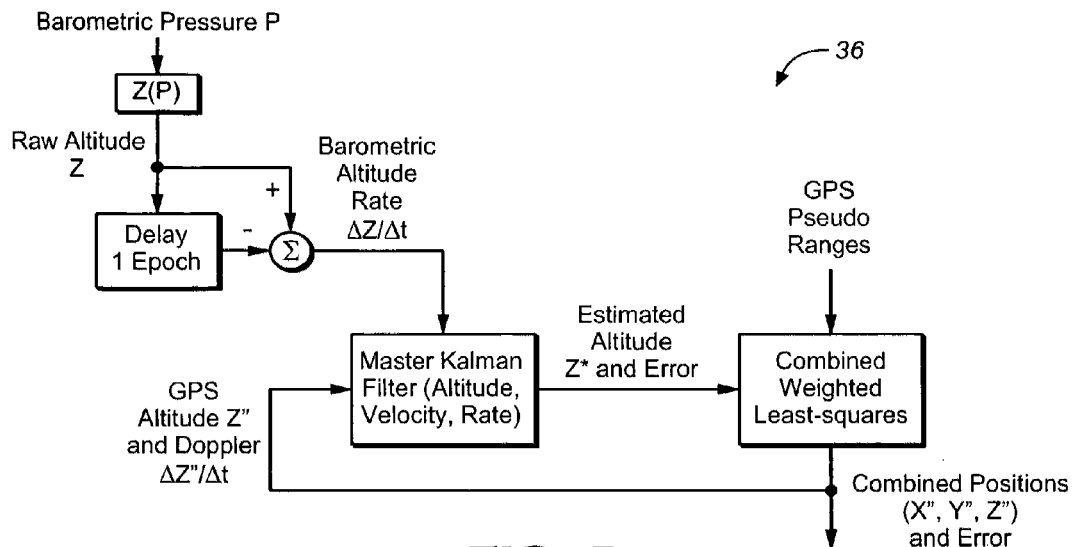
FIG. 5 illustrates three-state altitude filter architecture.

The final integration filter architecture explored was a combined altitude and velocity filter using three-states (FIG. 5, arrow 36). The model is described by:

$$\begin{bmatrix} \dot{h} \\ \ddot{h} \\ \dot{b} \end{bmatrix} = \begin{bmatrix} 0 & 0 & 0 \\ 0 & 1 & 0 \\ 0 & 0 & -1/\tau \end{bmatrix} \begin{bmatrix} h \\ \dot{h} \\ b \end{bmatrix} \tag{Eq. 10}$$

where the h parameters are the altitude (and derivatives), and the b parameters are the barometric altitude bias (and derivatives).

The altitude is modeled as an integrated random walk (with vertical velocity as the random walk component), while the barometric bias drift is modeled as a 1$^{st}$ order Gauss-Markov. It can be shown that the associated Kalman filter parameters are:

$$\Phi = \begin{bmatrix} 1 & 0 & 0 \\ 0 & 1 & 0 \\ 0 & 0 & e^{-\Delta t/\tau} \end{bmatrix} \tag{Eq. 11}$$

$$Q = \begin{bmatrix} S\Delta t/3^3 & S\Delta t/2^2 & 0 \\ S\Delta t/2^2 & S\Delta t & 0 \\ 0 & 0 & \sigma^2 \cdot (1 - e^{-2\cdot\Delta t/\tau}) \end{bmatrix} \tag{Eq. 12}$$

The measurements are the GPS altitude, the Doppler derived vertical velocity, and the barometric altitude pseudo derivative (modeled as a linear combination of actual vertical velocity together with barometric altitude bias drift). The corresponding update equations for the three measurements are $$H=[1\ 0\ 0], H=[0\ 1\ 0], H=[0\ 1\ 1] \tag{Eq. 13}$$

$$R=[\upsilon], R=[\upsilon], R=[\epsilon] \tag{Eq. 14}$$

The experimentally derived parameters are shown in Table 6.

TABLE 6

Kalman filter parameters for the three-state filter architecture

| Model Parameter | Value |
|---|---|
| Velocity variance S (m² s⁻²) | 0.0064 |
| Bias drift correlation time $\tau$ (s) | 4000 |
| Bias drift variance $\sigma^2$ (m² s⁻²) | 0.00006 |
| GPS altitude variance $\upsilon$ (m²) | 0.81 |
| GPS Doppler variance $\upsilon$ (m² s⁻²) | 0.06 |
| Barometric altitude drift variance $\epsilon$ (m² s⁻²) | 0.06 |

Backward-Smoothing

To improve calibration performance further in post-processing only situations, an extension was made to allow backward-smoothing of filter estimates using the algorithm by Fraser and Potter. Please, see H. Liu and G. L. Darkow, "Wind Effect on Measured Atmospheric Pressure", in *Journal of Atmospheric and Oceanic Technology*, February 1989, vol. 6, no. 1, available at http://ams.allenpress.com/archive/1520-0426/6/1/pdf/i1520-0426-6-1-5.pdf Please, also see: R. G.

Brown and P. Y. C. Hwang, "Introduction to Random Signals and Applied Kalman Filtering", $2^{nd}$ ed., Wiley, 1992, pp. 342-349

Backward-smoothing of filter estimates may be also implemented By using the algorithm developed by Rauch, Tung, and Striebel (RTS) algorithm.

Please, see: R. G. Brown and P. Y. C. Hwang, "Introduction to Random Signals and Applied Kalman Filtering", 2' ed., Wiley, 1992, chapter 8 (p. 330 351).

Estimates and errors from both a forward and reverse sweep of the Kalman filter are combined to form an improved estimate. Provided data is available for before and after an outage the estimation is smoothed and errors are reduced dramatically, especially for extended outages.

The smoothing filter can also be used to improve the existing Auto 2-D/3-D altitude constraint system within MCORR during post-processing. By updating using a constant altitude, the filter can be used to intelligently interpolate between either sides of a GPS outage, rather than using a simple flat ground assumption. During the forward pass, a posteriori $\hat{X}_n$ and $\hat{P}_n$ for the filter are stored for each Epoch n, in addition to the measurements, $z_n$. During the reverse pass, the stored $z_n$ are used to update the filter, and the a priori $\hat{x}_n$ and $\hat{P}_n$ for the reverse pass are also stored for each Epoch n.

Figure 6:
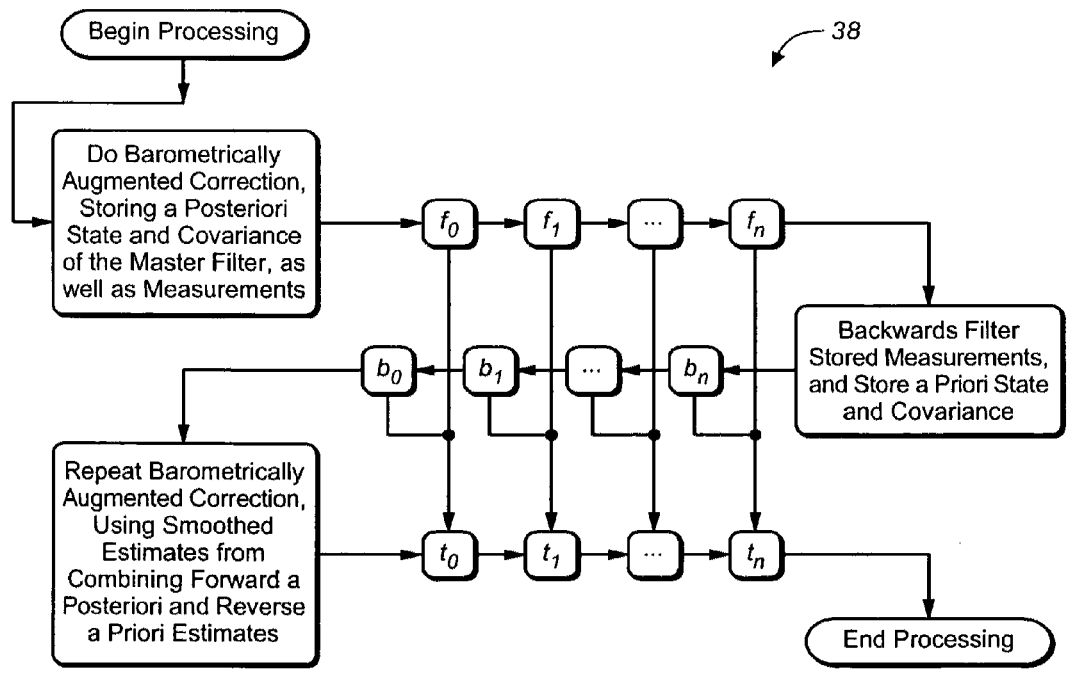
FIG. 6 is a flow chart showing the backward-smoothing extension to the standard barometrically augmented MCORR correction processes.

The smoothing process in the context of MCORR is summarized in FIG. 6 (as shown by arrow 38). Estimates from the forward pass $f_n$ and backward pass $b_n$ can be combined to form a smoothed estimate for each Epoch $t_n$, which can be used for the final MCORR barometric constraint.

Figure 7:
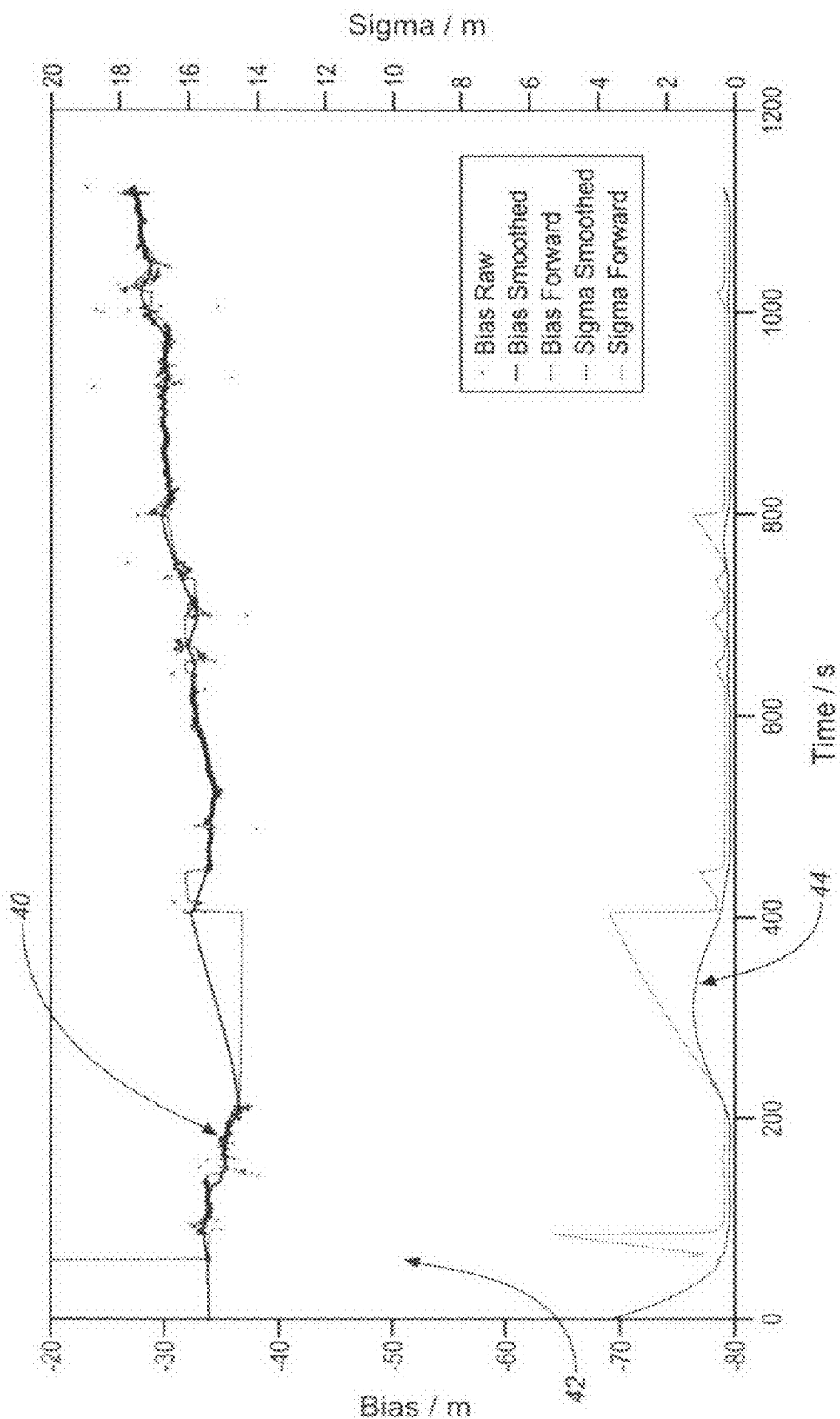
FIG. 7 illustrates Kalman filter performance with actual bias data. Note the improved estimates of the smoothed filter during outages and its smaller steady state errors compared to the single pass Kalman.

Typical smoothing performance (using the bias filter algorithm as an example) is shown in FIG. 7. The raw bias (arrow 40—black dots) is clearly noisy, with frequent outages due to GPS unavailability (most notably between t=200 s and 400 s). The forward Kalman filter (arrow 42—red) smoothes the raw bias, and provides a reasonable error estimate during outages, but is poor for altitude estimation during outages, with a sharp discontinuity as GPS becomes available again. The backward-smoothed filter (arrow 44—green) gives both a lower error and a better estimation of bias during an outage. It also removes any filter lag, which can be seen at approximately t=700 s and 1000 s, with the forward filtered result lagging behind the backward smoothed result. The backward-smoothing has also produced usable estimates at the start of the data set, where the forward filter has yet to converge.

Clock Coasting

Another extension considered was clock coasting. If the receiver clock is well behaved, and its error can be accurately predicted during an outage, it allows another constraint to be used in the GPS solution. Used together with the barometric altitude constraint, it allows the potential for two-satellite position fixes for a limited time. The range equivalent clock drift was modeled as an integrated Gauss-Markov process, using the same two-state Kalman filter described earlier (parameters shown in Table 7). The measurement for the filter is the Doppler derived range equivalent clock drift estimate.

TABLE 7

Kalman filter parameters for receiver clock error drift

| Model Parameter | Value |
| --- | --- |
| Correlation time $\tau$ (s) | 18000 |
| Model variance $\sigma^2$ (m$^2$ s$^{-4}$) | 0.0001 |
| Measurement variance $\upsilon$ (m$^2$ s$^{-2}$) | 0.25 |

Figure 8:
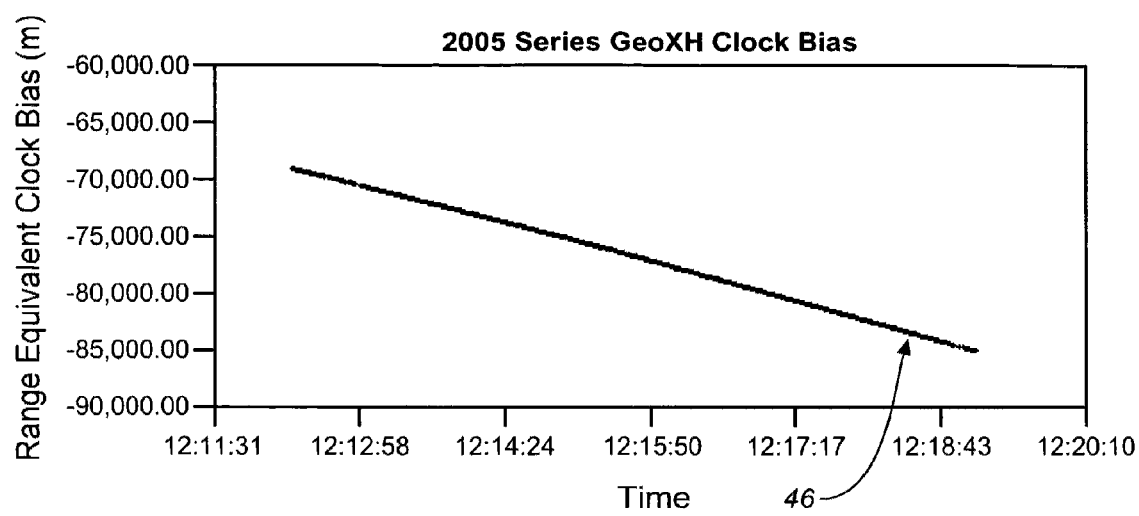
FIG. 8 depicts 2005 series GeoXH receiver clock behavior.

A very simple algorithm based on a constant clock drift assumption was used for the clock constraint, since the receiver clock bias drift on the 2005 series GeoXH is generally very smooth and predictable (FIG. 8, arrow 46).

When measurements are available, the range equivalent clock bias is stored as a reference. The range equivalent estimated clock bias during an outage ($c\hat{\Delta}t_{n+k}$) is calculated based on the predicted drift from the stored reference ($c\Delta t_n$) over the coasting time interval k using a constant drift estimate ($c\hat{\dot{\Delta}}t_{n+k}$), given by $$c\hat{\Delta}t_{n+k} = c\hat{\dot{\Delta}}t_{n+k} \cdot k + c\Delta t_n \quad \text{(Eq. 15)}$$

The additional constraint is then added in a similar manner to the altitude constraint to the least squares solver.

Differential Barometry

If a fixed base station/receiver acting as base near the rover has its own barometer logging barometric pressure, it could be used to differentially correct the barometer data from the rover as well. Provided the base and rover are relatively close together (i.e. same suburb or city), they will observe the same pressure drifts due to atmospheric conditions. The remaining difference would be caused by actual altitude changes between rover and base. Differential barometry would allow the barometric constraint to be used for a much longer period of time, potentially even the whole data collection session.

The concept is similar to the three-state filter, with GPS providing an absolute range reference and Doppler velocities, and the barometric pressure providing extra vertical velocity information, except that now the barometric vertical velocity is:

$$\hat{h}_{barometric} = \hat{h}_{baro,rover} - \hat{h}_{baro,base} \quad \text{(Eq. 16)}$$

as opposed to $$\hat{h}_{barometric} = \hat{h}_{baro,rover} \quad \text{(Eq. 17)}$$

The integration parameters were modified to force the constraint to be used almost all the time (Tables 8, 9, 10).

TABLE 8

Standard conditions for which an altitude constraint is preferred (Base Corrected)

| Minimum mean SNR | Maximum PDOP | Minimum SV count |
| --- | --- | --- |
| 40 dB Hz | 3.5 | 6 |

TABLE 9

Conditions for which the 3-D fix is good enough for calibration (Base Corrected)

| Minimum mean SNR | Maximum PDOP | Minimum SV count |
| --- | --- | --- |
| 40 dB Hz | 6.0 | 5 |

TABLE 10

| Conditions for altimeter calibration (Base Corrected) | | | |
|---|---|---|---|
| Initial GPS calibration measurements required | Drift allowed between altitude estimate and last calibration | Variance in altitude estimate allowed with SV count above 3 | Variance in altitude estimate allowed when SV count is 3 |
| 5 | 1000 m | 1.5 m$^2$ | 1000 m$^2$ |

The filters also had to be modified (Table 11 and Table 12), with the additional altitude rate filter required due to the extra (1 m s$^{-1}$ typical) noise resulting from the extreme differencing of measurements.

TABLE 11

Kalman filter parameters for the three-state filter architecture (Base Corrected)

| Model Parameter | Value |
|---|---|
| Velocity variance S (m$^2$ s$^{-2}$) | 0.0004 |
| Bias drift correlation time τ (s) | 40000 |
| Bias drift variance σ$^2$ (m$^2$ s$^{-2}$) | 0.00006 |
| GPS altitude variance υ (m$^2$) | 0.81 |
| GPS Doppler variance υ (m$^2$ s$^{-2}$) | 0.04 |
| Barometric altitude rate variance ε (m$^2$ s$^{-2}$) | 0.001 |

TABLE 12

Kalman filter parameters for barometric altitude filter under base correction

| Model Parameter | Sensor (altitude rate) |
|---|---|
| Correlation time τ (s) | 10 |
| Model variance σ$^2$ (m$^2$ s$^{-2}$) | 0.01 |
| Measurement variance υ (m$^2$) | 1.0 |
| Rate measurement variance υ (m$^2$ s$^{-2}$) | N/A |

Evaluation—Testing.

Test data was gathered using the GeoXH and TSIP Status software. The sensor box was strapped in a horizontal position on the outside of a backpack, connected to the GeoXH using a USB cable. A Zephyr antenna, mounted on the backpack, was also used (not shown).

The GeoXH was held approximately at chest level, extended forwards to a comfortable arm reach. While moving about, the backpack was worn on the shoulders and care was taken to keep the GeoXH at approximately the same relative altitude to the bag to avoid changing the offset. Field data was gathered at various locations on foot. Conditions were moderate, with light drizzle and a small breeze in worst cases. The SSF data was processed using the modified MCORR engine and results analyzed based on yield and HRMS error (both total and cross track).

Equivalent Mask Comparisons

A comparison was made between standard 3-D MCORR, Auto 2-D/3-D mode MCORR, and the new barometrically aided MCORR using the same correction masks. Results obtained using the bias and three-state filter algorithms are shown below for comparison. The cases shown here are only representative cases for each environment. Additional results were produced but were not included since they were similar to those already here. Results from the differential algorithm were somewhat inferior and less reliable, and are not shown here.

Simulation Environments

To simulate bad conditions with a truth reference, data from open sky environments were modified during post processing. The elevation mask was periodically raised to a test value for 20 seconds and lowered again for 40 seconds after an initial period of 60 seconds with nominal elevation mask in order to simulate intermittent bad geometry due to limited SV count.

At the flat open location at Maryland's Reserve, Riccarton, with overall altitude variation <3 m, the data was collected on Nov. 12, 2007 from 4:59:43 pm to 5:10:18 pm. The following processing masks were used: SNR 37 dB Hz, PDOP 6.0, nominal elevation 5°. The data was collected on flat, open terrain, walking back and forth in an approximately straight line many times. Yield and RMS horizontal error (versus an L1 carrier float solution) were calculated for each correction output.

Three-State Filter

Results from the three-state filter algorithm are shown in Table 13.

TABLE 13

Yield and horizontal error results for a flat and open environment using various elevation masks using a three-state filter algorithm.

| Test | Yield (%) | | | HRMS error (m) | | | |
|---|---|---|---|---|---|---|---|
| | | | | | | Baro. Aided | |
| Elevation Mask | Standard | Fixed Alt. | Baro. Aided | Standard | Fixed Alt. | All Positions | Aided Positions |
| 25° | 99.5 | 100 | 100 | 0.31 | 0.31 | 0.28 | 0.26 |
| 35° | 68.5 | 100 | 100 | 0.30 | 0.30 | 0.30 | 0.31 |
| 45° | 68.5 | 87.4 | 87.4 | 0.33 | 0.31 | 0.31 | 0.22 |

Bias Filter

Results obtained from the bias filter algorithm (not shown) are substantially the same as those produced by three-state filter algorithm.

TABLE 14

Yield and horizontal error results for a flat and open environment using various elevation masks using a bias filter.

| Test | Yield (%) | | | RMS Horizontal error (m) | | |
|---|---|---|---|---|---|---|
| Elevation Mask | Standard | Fixed Alt. | Baro. Aided | Standard | Fixed Alt. | Baro. Aided |
| 25° | 99.5 | 100 | 100 | 0.31 | 0.31 | 0.28 |
| 35° | 68.5 | 100 | 100 | 0.30 | 0.30 | 0.30 |
| 45° | 68.5 | 87.4 | 87.4 | 0.33 | 0.31 | 0.31 |

Three-State Filter.

Results from the three-state filter algorithm for a hill open environment are shown in Table 15.

TABLE 15

Yield and horizontal error results for a hill and open environment using various elevation masks using a three-state filter algorithm.

| Test Elevation Mask | Yield (%) | | | HRMS error (m) | | | |
|---|---|---|---|---|---|---|---|
| | Standard | Fixed Alt. | Baro. Aided | Standard | Fixed Alt. | Baro. Aided All Positions | Aided Positions |
| 25° | 60.2 | 60.2 | 88.7 | 0.49 | 0.49 | 0.53 | 0.63 |
| 35° | 60.2 | 79.1 | 88.7 | 0.51 | 0.82 | 0.60 | 0.78 |
| 45° | 60.2 | 88.7 | 88.7 | 0.50 | 0.85 | 0.61 | 0.79 |

The barometric aided results show a large increase in yield, with only a slight increase in horizontal error. As the elevation mask is raised (simulating bad conditions), the barometric aided performance is clearly superior compared to the fixed altitude solution, with no reduction in yield The apparent increase in yield of the fixed altitude solution with increasing elevation mask is due to the fact that as the elevation mask is increased, the SV count gradually reduces from four to three. Under four satellites, the fixed altitude solution is not invoked (despite bad conditions), and hence positions are unavailable. When the SV count reduces to three however, the fixed altitude solution is enabled, thus increasing the number of available solutions.

Bias Filter

Results obtained from the bias filter algorithm for a hill, open environment are shown below. Position quality is slightly worse than with the three-state filter algorithm, with approximately 10% higher RMS horizontal error. Altitude estimation during outages also appears inferior.

TABLE 16

Yield and horizontal error results for a hill and open environment using various elevation masks

| Test Elevation Mask | Yield (%) | | | RMS horizontal error (m) | | |
|---|---|---|---|---|---|---|
| | Standard | Fixed Alt. | Baro. Aided | Standard | Fixed Alt. | Baro. Aided |
| 25° | 60.2 | 60.2 | 88.7 | 0.49 | 0.49 | 0.62 |
| 35° | 60.2 | 79.1 | 88.7 | 0.51 | 0.82 | 0.69 |
| 45° | 60.2 | 88.7 | 88.7 | 0.50 | 0.85 | 0.69 |

Difficult Environments

Data in these cases were gathered from actual difficult environments, so truth positions are unavailable. Where possible, errors were estimated by calculating cross-track errors from a straight line trajectory. Otherwise, they must be evaluated by eye on the map view.

Three-State Filter

Results from the three-state filter algorithm are shown in Table 17.

TABLE 17

Yield and cross-track error results from a flat, canopy environment

| | Standard | Fixed Alt. | Baro. Aided | |
|---|---|---|---|---|
| | | | Total | Aided |
| Yield (%) | 51 | 68 | 83 | |
| HRMS cross-track error (m) | 0.7 | 2.0 | 0.9 | 1.0 |

For this data set, the barometric aided solution has a much higher yield than the standard result, with only a slight increase in cross-track error. It is clearly superior compared to the Auto 2-D/3-D solution both in terms of yield and accuracy. Although the fixed altitude solution does have higher cross-track error overall than the barometric aided solution overall, the actual difference is not as high as the HRMS figure suggests, due to the presence of the two outliers at the top of the track (not shown).

Bias Filter

Results obtained from the bias filter algorithm are essentially identical to those produced by the three-state filter algorithm.

TABLE 8

Yield and cross-track error results from a flat, canopy environment by using a bias filter.

| | Standard | Fixed Alt. | Baro. Aided |
|---|---|---|---|
| Yield (%) | 51 | 68 | 83 |
| HRMS cross-track error (m) | 0.7 | 2.0 | 0.9 |

Hill, Canopy.

The data was collected on hilly terrain, up and down the hill on the same path twice. The two ends of the path were in relatively open terrain, but were connected by a region with overhead canopy, as well as a building and a small cliff face in areas. The data was corrected both with and without barometric augmentation.

Three-State Filter

Yield results from the three-state filter algorithm are shown in Table 19. Since no reference track was available, there are no numerical measures of error for this data set. The increase in yield provided by the barometric augmentation is substantial.

TABLE 19

Yield results from a hill, canopy environment

| | Standard | Fixed Alt. | Baro. Aided |
|---|---|---|---|
| Yield (%) | 35 | 45 | 71 |

The accuracy of the barometric aided solution is still reasonable, following a track through the canopy even in the middle region where the standard solution produces no positions at all. The fixed altitude solution is completely unacceptable here, with many positions in the middle region having horizontal errors of over 10 m.

Bias Filter
Results obtained by using a bias filter algorithm are similar to the results obtained by using a three-state filter algorithm, except with lower yield. This is due mostly to better convergence characteristics of the three-state filter model at the start of the data set. The bias filter alone does not converge to an acceptable level until the second outage.

TABLE 20

Yield results from a hill, canopy environment obtained by a bias filter.

| | Standard | Fixed Alt. | Baro. Aided |
|---|---|---|---|
| Yield (%) | 35 | 45 | 64 |

Flat, Urban
The data was collected on flat terrain, walking back and forth in an approximately straight line many times. The two ends of the line were in open terrain, but were connected by a region with close two-story buildings. The data was corrected both with and without barometric augmentation.

Three-State Filter
Results from the three-state filter algorithm are shown in Table 21.

TABLE 21

Yield and cross-track error results from a flat, urban environment

| | | | Baro. Aided | |
|---|---|---|---|---|
| | Standard | Fixed Alt. | All Positions | Aided Positions |
| Yield (%) | 32 | 74 | 65 | |
| HRMS cross-track error (m) | 0.5 | 1.1 | 1.0 | 1.1 |

The improvement in horizontal accuracy provided by barometric constraint over the fixed Auto 2-D/3-D solution is significant (not shown). The yield increase from the constraint is significant, with much greater coverage between buildings than in the standard solution.

Bias Filter
Results obtained from the bias filter algorithm are shown below. They are essentially identical to those produced by the three-state filter algorithm.

TABLE 22

Yield and cross-track error results from a flat, urban environment

| | Standard | Fixed Alt. | Baro. Aided |
|---|---|---|---|
| Yield (%) | 32 | 74 | 65 |
| HRMS cross-track error (m) | 0.5 | 1.1 | 1.0 |

Equivalent Yield Comparisons
To compare the advantages of barometric constraint when yield is of primary concern (e.g. navigation), the difference between the barometric aided results (three-state filter) using the standard correction masks earlier and results from standard MCORR with very open masks was compared. To do this, the masks for standard MCORR were relaxed until yields approached that produced by the barometric aided results.

Hill, Open
The data is obtained only the 25° simulated elevation mask case since because beyond this satellite visibility becomes too limited to allow yield matching.

TABLE 23

Yield and horizontal error results for a flat and open environment with simulated elevation mask

| | Yield (%) | | | HRMS error (m) | | | |
|---|---|---|---|---|---|---|---|
| | Standard | | | Standard | | | |
| Test | 37 dB Hz | 30 dB Hz | | 37 dB Hz | 30 dB Hz | Baro. Aided | |
| Elevation Mask | PDOP 6 | PDOP 80 | Baro. Aided | PDOP 6 | PDOP 80 | All Positions | Aided Positions |
| 25° | 60.2 | 88.7 | 88.7 | 0.49 | 1.9 | 0.53 | 0.63 |

The combination of the hill obscuring half the sky and the increased elevation mask has caused extremely high DOP values. To match yields, the PDOP mask for standard MCORR had to be set to above 70, which has lead to a much larger RMS horizontal error compared to the barometric aided solution (not shown).

Difficult Environments
Flat, Canopy
Results from the flat canopy environment are shown in Table 24.

TABLE 24

Yield and cross-track error results from a flat, canopy environment

| | Standard | | Baro. Aided | |
|---|---|---|---|---|
| | 37 dB Hz PDOP 6 | 30 dB Hz PDOP 24 | All Positions | Aided Positions |
| Yield (%) | 51 | 83 | 83 | |
| HRMS cross-track error (m) | 0.7 | 1.3 | 0.9 | 1.0 |

Clearly, to reach the same yields available from the barometric aided results, both the SNR and PDOP masks had to be relaxed greatly for standard MCORR. More significantly, given the same yield, the barometric aided solution has noticeably lower HRMS cross-track error than the open mask correction using standard MCORR.

Hill, Canopy
Results from the hill canopy environment are shown in Table 25. Once again, no error analysis is possible since there is no reference track.

TABLE 25

Yield results from a hill, canopy environment

| | 37 dB Hz PDOP 6 | 33 dB Hz PDOP 15 | Baro. Aided |
|---|---|---|---|
| Yield (%) | 35 | 72 | 71 |

Matching the yield has required a significant relaxing of masks. This has also resulted in degraded horizontal accuracy, with a significant number of outliers in the open mask MCORR results.

Equivalent Error Comparisons
To compare the yield increases produced by barometric constraint with similar quality GPS results, the difference between the barometric aided results (three-state filter) using the standard correction masks earlier and results from standard MCORR with very open masks was compared. To do this, the masks for standard MCORR were relaxed until position errors approached that produced by the barometric aided results.

Difficult Environments
Flat, Canopy
Results from the flat canopy environment are shown in Table 26. Errors for standard correction using slightly reduced masks result in a similar error to the barometric aided positions, but yield is significantly lower.

TABLE 26

Yield and cross-track error results from a flat, canopy environment

|  | Standard | | Baro. Aided | |
| --- | --- | --- | --- | --- |
|  | 37 dB Hz PDOP 6 | 33 dB Hz PDOP 8 | All Positions | Aided Positions |
| Yield (%) | 51 | 68 | 83 | |
| HRMS cross-track error (m) | 0.7 | 1.0 | 0.9 | 1.0 |

The barometric aided and standard corrected positions (using relaxed masks) have similar quality overall, except that the standard correction has produced an outlier mid-right with an error of approximately 10 m.

Hill, Canopy
Results from the hill canopy environment are shown in Table 27. Errors could not be matched by numerical analysis since no reference track is available.

TABLE 27

Yield results from a hill, canopy environment

|  | 37 dB Hz PDOP 6 | 33 dB Hz PDOP 8 | Baro. Aided |
| --- | --- | --- | --- |
| Yield (%) | 35 | 56 | 71 |

The standard algorithm with slightly relaxed correction masks produced results similar to the barometric aided ones overall, with much lower yield.

Moving Vehicle
Tests were also conducted to study the performance of the system on moving vehicles. A vehicle was driven on relatively open ground, and the barometric/GPS altitudes compared. Data was logged using the same system as before, with the GeoXH and sensor box on the front passenger seat. An external Zephyr GPS antenna was mounted on the vehicle roof, with the window shut as tight as possible (not shown). The test was performed using a Zephyr antenna on roof, GeoXH and sensor box in the front passenger seat of a Nissan Bluebird, on School Road, Yaldhurst.

Zephyr GPS antenna is a dual frequency GPS antenna for high-accuracy applications with the GeoXH™ handhelds and ProXH™ receiver produced by Trimble. Trimble's Zephyr™ external L1/L2 GPS antenna contains advanced technology for extremely low multipath, outstanding low elevation satellite tracking, and sub-millimeter phase center accuracy. The car was driven at various speeds up to 100 km hr$^{-1}$ on a straight road. The barometric altitude was logged and compared with the GPS altitude after post-processing. Standard MCORR correction masks used were PDOP 6.0, SNR 37 dB Hz, and elevation 5°.

Opening Windows
At approximately 35 s, 90 s, and 110 s, the driver's seat window was opened fully and then closed, while maintaining a 100 km hr$^{-1}$ cruising speed. This caused up to 15 m of barometric altitude error. In addition, there appears to be a substantial pressure equalization delay—at approximately 110 s, despite fully closing the window, the error does not manage to decay back to the nominal value of approximately 43 m (c.f. after the opening at 35 s) (not shown).

Ventilation Fan
The effect of turning on the internal ventilation fan to maximum at 100 km hr$^{-1}$ resulted in an error of approximately 2 m (not shown).

Acceleration
For this test (not shown), the car was repeatedly accelerated up to 100 km hr$^{-1}$ and subsequently stopped. The error here is also about 2 m (for a peak absolute acceleration of approximately 4 m s$^{-2}$). This may have simply been due to the very small gap in the window for the Zephyr antenna cable however.

Vertical Velocity Limiting
In all cases except opened windows under rapid acceleration and deceleration, the altitude error is limited to about 2 m. This is small enough to have negligible effect on horizontal error under code processing. To counteract the effects of the open windows case, a vertical velocity limit based approach was used. The estimated vertical velocity is monitored from one Epoch to the next one.

If the absolute vertical velocity is above 0.5 m s$^{-1}$ (far above typical rates on foot, as can be seen in the hill data in sections and the total drift from the last stable altitude is greater than 1 m, the altimeter filter is reset and unable to be used until it is recalibrated and the rate of ascent/descent reduces again.

The effect of the velocity limiting has been monitored at 120 s, 310 s, 360 s, 420, and 480 s. During these times, the vehicle underwent rapid acceleration/deceleration with open windows. With the standard scheme (velocity monitoring off), the resulting altitude error reaches a maximum of 10 m at 120 s. With the vertical velocity limited however, barometric augmentation becomes disabled for such cases, and the worst case error is reduced to about 2 m. The effect on horizontal error was not apparent on an overhead map and was not included.

Flat Ground Drift Constraint
The flat ground drift constraint was tested using the urban data set. For the test, the barometric drift tolerance in the correction algorithm was disabled (with all other parameters unchanged), and correction results compared to that with drift allowed. Please, see Table 28. The drift constraint has increased the yield by nearly 20%, while the cross-track error has increased slightly (by approximately 10%).

TABLE 28

Yield and cross-track error results from a flat, urban environment

|  | Drift Not Allowed | Drift Allowed |
| --- | --- | --- |
| Yield (%) | 55 | 65 |
| HRMS cross-track error (m) | 0.9 | 1.0 |

Pruning
The post-correction pruning of positions to 1 m of error ellipse semi major axis error was tested using the flat canopy and urban data sets, using the three-state filter algorithm. Previously for these two data sets, the standard barometric aided results showed a large increase in yield, but also an increase in the number of less accurate positions. Table 29 shows the results with pruning enabled.

TABLE 29

Yield and cross-track results comparing standard to pruned barometric aided MCORR

| | Yield (%) | | HRMS cross-track error (m) Baro. Pruned | | |
|---|---|---|---|---|---|
| Data Set | Standard | Baro. Pruned | Standard | All Positions | Aided Positions |
| Flat, Canopy | 51 | 61 | 0.7 | 0.6 | 0.7 |
| Flat, Urban | 32 | 46 | 0.5 | 0.5 | 0.7 |

In both cases, when compared with standard MCORR, there is still a yield increase (although less dramatic, at approximately 20%) in the barometric aided results. Various thresholds between 1 m and 2 m were also tested, with a predictable increase in accuracy and lowering of yield increases with lower thresholds, and vice versa (up to the full constrained results obtained without the pruning).

Backward-Smoothing

The barometric backward-smoothing algorithm was tested using the hill, open data set. A rising elevation mask of 35° was used to simulate bad GPS conditions. For the test, backward-smoothing was enabled, and correction results compared to that with standard forward filtering.

Backward-smoothing was also applied to GPS only data from Mt.

Pleasant using the bias filter algorithm. For the test, correction results of the existing fixed altitude Auto 2-D/3-D, backward-smoothed barometric, and GPS-only Auto 2-D/3-D backward-smoothed algorithms were compared (Table 30). The GPS-only Auto 2-D/3-D backward-smoothing was performed by forcing barometric pressure updates to zero. The bias filter then gives a filtered GPS altitude, which can then be backward-smoothed. Compared to the results in Table 19, there has been a large increase in yield in both cases, at 20% for barometric and 70% for GPS-only Auto 2-D/3-D.

TABLE 30

Yield results from a hill, canopy environment

| | Fixed Alt. | Baro. Aided Smoothed | Fixed Alt. Smoothed |
|---|---|---|---|
| Yield (%) | 45 | 77 | 77 |

The smoothed GPS-only positions are clearly better than the existing fixed altitude solutions, and appear to be comparable to the barometrically aided results.

Clock Coasting

The clock coasting constraint was tested for a variety of integration schemes.

Useful results were obtained for clock coasting in two satellite situations, used together with the barometric altitude constraint. Results from the flat canopy and urban environments are shown in Table 31.

TABLE 31

Yield and cross-track results comparing standard to barometric and clock aided MCORR

| | Yield (%) | | HRMS cross-track error (m) Baro. + Clock | | |
|---|---|---|---|---|---|
| Data Set | Standard | Baro. + Clock | Standard | All Positions | Aided Positions | 2 SV Positions |
| Flat, Canopy | 51 | 89 | 0.7 | 1.0 | 1.3 | 2.3 |
| Flat, Urban | 32 | 68 | 0.5 | 1.1 | 1.2 | 1.6 |

The two satellite positions (not shown) generally have horizontal error estimates of approximately 5-10 m, heavily skewed in one direction due to the limited geometry offered by only two satellites. Actual positions appear to be generally reasonable however, with HRMS cross-track errors of less than 3 m. It was found that used alone, the clock error constraint tends to produce rather poor positions since it has a large effect on all the remaining pseudo range measurements. Despite the smoothness of the clock bias drift, the range equivalent drift rate observed on the GeoXH receiver clock was still over 30 m s$^{-1}$. Thus, even a small error in the drift estimate can result in fairly large range errors. The same is the case if the clock bias and altitude constraints are used together in a many satellite situation. The clock error estimate then affects all the pseudo range measurements, negating the benefits of the altitude constraint. Thus, the clock constraint should only be used only when absolutely necessary, and even then only with another independent constraint (such as the barometric altitude).

Flat, Canopy

GeoXH processing masks: SNR 37 dB Hz, PDOP 6.0, elevation 5°

JunoST processing masks: SNR 20 dB Hz, PDOP 6.0, elevation 5°

The data was collected on flat terrain using both the JunoST and GeoXH, walking back and forth in an approximately straight line many times. The two ends of the line were in open terrain, with overhead canopy in between. The data was corrected both with and without barometric augmentation for both receivers.

Table 32 clearly shows the improvements produced by barometric aiding for both receivers. By using barometric and clock aiding, the GeoXH yield has increased by nearly 80% (still about 20% less than the JunoST), with only a slight decrease in precision. In the case of the JunoST, barometric aiding has increased precision by nearly 20%.

TABLE 32

Yield and cross-track error results from a flat, canopy environment comparing aiding of the GeoXH and JunoST

| | | Baro. + Clock Aided GeoXH | | | Baro. Aided JunoST | |
|---|---|---|---|---|---|---|
| | GeoXH | All Positions | Aided Positions | JunoST | All Positions | Aided Positions |
| Yield (%) | 44 | 77 | | 98 | 99 | |
| HRMS cross-track error (m) | 1.4 | 1.6 | 1.7 | 3.6 | 3.0 | 3.4 |

Flat, Urban

GeoXH processing masks: SNR 37 dB Hz, PDOP 6.0, elevation 5°

JunoST processing masks: SNR 20 dB Hz, PDOP 6.0, elevation 5°

The data was collected on flat terrain using both the JunoST and GeoXH, walking back and forth in an approximately straight line many times. The data was corrected both with and without barometric augmentation for both receivers.

Results in Table 33 show that in urban environments (where satellites can be totally blocked) the GeoXH with aiding can reach similar yield levels as an unaided JunoST, with significantly better accuracy. The JunoST has also benefited from barometric aiding, with both yield and accuracy improvements.

TABLE 33

Yield and cross-track error results from a flat, urban environment comparing aiding of the GeoXH and JunoST

|  | GeoXH | Baro. + Clock Aided GeoXH | | JunoST | Baro. Aided JunoST | |
| --- | --- | --- | --- | --- | --- | --- |
|  |  | All Positions | Aided Positions |  | All Positions | Aided Positions |
| Yield (%) | 54 | 83 | | 87 | 99 | |
| HRMS cross-track error (m) | 0.4 | 0.6 | 0.7 | 3.0 | 2.4 | 2.9 |

There are significant differences between the two receivers. With barometric aiding, the coverage provided by the GeoXH between buildings is excellent, and remains much more accurate than the JunoST results, which have bad multipath due to reflections from buildings, despite having many satellites and good DOP at the open areas either side of the buildings.

Flat, Heavy Canopy

GeoXH processing masks: SNR 37 dB Hz, PDOP 6.0, elevation 5°

JunoST processing masks: SNR 20 dB Hz, PDOP 6.0, elevation 5°

The data was collected on flat terrain using both the JunoST and GeoXH. The two receivers were kept in the open initially for roughly 15 minutes until the constellation had been fixed. Multiple point features of approximately 30 seconds were collected at two surveyed points in heavy canopy (wet pine), with walks out into a clearing between each feature. Conditions were extremely bad, with only six satellites visible in the clearing. The data was corrected both with and without barometric augmentation for both receivers.

Yield (point feature) and horizontal error results (compared to the survey point) are shown Table 34 and Table 35, for both raw positions and averaged point feature positions. In all cases, barometric aiding has increased yield, with the most extreme improvement being for the GeoXH at truth point 1 from no positions to 33% yield. Accuracy was poor for all cases, but with averaging, the point feature error is less than 5 m for the GeoXH. The GeoXH with aiding is once again much more accurate than the JunoST. Barometric aiding increased vertical accuracy significantly in all cases, but lead to an increase in overall horizontal error in some cases.

TABLE 34

Yield and horizontal error results from a flat, heavy canopy environment at truth point 1 comparing aiding of the GeoXH and JunoST

|  | GeoXH | Baro. + Clock Aided GeoXH | JunoST | Baro. Aided JunoST |
| --- | --- | --- | --- | --- |
| Yield (%) | 0 | 33 (2/3 features) | 86 (3/3 features) | 97 (3/3 features) |
| HRMS error (m) | — | 1.8 | 17 | 20 |
| Point Feature HRMS error (m) | — | 1.0 | 15 | 15 |

TABLE 35

Yield and horizontal error results from a flat, heavy canopy environment at truth point 2 comparing aiding of the GeoXH and JunoST

|  | GeoXH | Baro. + Clock Aided GeoXH | JunoST | Baro. Aided JunoST |
| --- | --- | --- | --- | --- |
| Yield (%) | 10 (1/4 features) | 17 (1/4 features) | 77 (4/4 features) | 90 (4/4 features) |
| HRMS error (m) | 3.4 | 6.4 | 20 | 16 |
| Point Feature HRMS error (m) | 2.7 | 3.7 | 11 | 10 |

Clearly, raw horizontal accuracy is very poor, with the JunoST much worse than the GeoXH. Bad satellite geometry has resulted in very directional errors.

Differential Barometer

A laptop with its own USB weather board and GeoXH GPS connection was placed in a sheltered logging station on the TNZ rooftop, and controlled via a remote desktop connection to log barometric and GPS data the same way as the prototype rover. Data was also logged from http://weather.cobbnz.com/weatherservice/xml.aspx?WebServerURL=http://www.zl3gp.co.nz, a private weather station in Burwood. This was smoothed and interpolated offline (since it is only available every 15 seconds, resolution 10 Pa) and used as another barometric correction source. Data was collected using the prototype as before, and the SSF splicing tool used to inject the base barometric data into the rover file. The MCORR algorithm was modified to read the base data and differentially correct the barometric altitude. Results were then compared with standard MCORR as well as the non-base-corrected barometric constraint.

Flat, Heavy Canopy

GeoXH processing masks: SNR 37 dB Hz, PDOP 6.0, elevation 5°

The GeoXH was kept in the open for approximately one minute before entering canopy. A point feature of was then collected under heavy canopy at the known survey points for over two minutes each.

Results are shown in Table 36 and Table 37. In both cases, the base corrected barometric constraint has resulted in a dramatic increase in both yield and accuracy compared to both the GPS only and normal, non-base-corrected results. At both survey points, the base corrected point features are less than half a meter away from truth. They are also better than those for when the non-base-corrected results are force used for extended periods of time. Note that the results from forced use of the constraint could be very different depending on the weather, since it is essentially allowed to drift uncorrected for extended periods of time. The resulting yields are equivalent but using the uncorrected barometric constraint for extended periods results in increased error.

TABLE 36

Yield and horizontal error results from a flat, heavy canopy environment at truth point 1 comparing normal and base corrected barometric aiding, as well as results for when the non-base-corrected constraint is force used for extended periods.

|  | Standard | Baro. + Clock Aided | Baro. + Clock Aided Force Used | Baro. + Clock Aided Base Corrected |
|---|---|---|---|---|
| Yield (%) | 1 (1/1 features) | 24 (1/1 features) | 51 (1/1 features) | 97 (1/1 features) |
| Point Feature error (m) | 4.6 | 1.8 | 1.0 | 0.1 |

TABLE 37

Yield and horizontal error results from a flat, heavy canopy environment at truth point 2 comparing normal and base corrected barometric aiding, as well as results for when the non-base-corrected constraint is force used for extended periods

|  | Standard | Baro. + Clock Aided | Baro. + Clock Aided Force Used | Baro. + Clock Aided Base Corrected |
|---|---|---|---|---|
| Yield (%) | 8 (1/1 features) | 8 (1/1 features) | 51 (1/1 features) | 51 (1/1 features) |
| Point Feature error (m) | 2.3 | 2.3 | 0.3 | 0.2 |

Standard MCORR has produced very few positions as before, and clearly, the spread of positions is still huge despite barometric constraint. The base-corrected results are clearly centered on the survey point however, more so than both the non-base-corrected normal and force used positions.

The enhanced altitude accuracy is provided by the base correction.

Without any base correction, the standard rover only scheme is forced to rely on GPS data for calibration, which has resulted in errors as conditions get worse.

The barometric constraint forced used without correction clearly begins to drift, and after the outage at the end is almost 5 m off the GPS altitude (in open sky once more), after 30 minutes under canopy. Although the force using the uncorrected barometric constraint has resulted in greater accuracy for this particular data set, for bad weather or longer sessions under canopy the drift may become much worse.

Prototype Performance

The integration of barometric altitude constraints and GeoXH GPS data into the standard MCORR engine has produced promising results. The biggest improvement compared to standard MCORR has been in terms of yield in moderately bad environments. Actual results depend on the testing environment, but from the cases observed, yields of over 20% can be expected (sometimes up to 70-80%). As a trade-off, the HRMS error typically increased by about 10%, with the worst case being at roughly 20%. Accuracy was generally at meter-level, with the occasional bad position with an error of about 5 m at worst.

Many of the extra positions offered by barometric altitude constraint were slightly poorer quality than usual; the spread of barometrically constrained positions using typical masks (SNR 37 dB Hz, PDOP 6.0) tended to be similar to standard correction results using slightly more relaxed masks (SNR 33 dB Hz, PDOP 8.0). They were generally more reliable however, with no significant outliers. For extremely bad environments where all available GPS measurements may be marginal, the barometric constraint still improves vertical accuracy significantly, but often at the expense of horizontal accuracy.

In all tested cases, when the masks of standard MCORR were relaxed to produce similar yields to barometric aided solutions, the accuracy of barometric aided solutions were noticeably superior. In this respect, barometric aiding was able to increase accuracy in very poor conditions. In addition, with the masks adjusted to give similar accuracy results, the barometric aided correction was still able to deliver a 10-20% increase in yield. Of course, without a real truth, it is difficult to determine actual accuracy simply by looking at HRMS cross-track errors in the straight line cases. Even in the simulated cases where there was a truth reference, the results may not be indicative of typical performance since the simulation only removed satellites using an elevation mask; it did not replicate the effects of other types of bad geometry and low measurement SNR. In comparisons with existing systems that aim to increase yield, the barometric aided GeoXH was clearly superior. Existing Auto 2-D/3-D processing could produce similar yield increases and errors on flat ground, but on hills it was predictably inferior. The JunoST, even with its heavy smoothing and PV filtering, could not deliver anywhere near the accuracy produced by the aided GeoXH. Under moderate canopy conditions, the JunoST still produced higher yield (but only by about 20%, rather than 50% as before), but in urban environments, the aided GeoXH essentially matched the JunoST in terms of yield, while remaining at meter-level accuracy. Barometric aiding also improved JunoST results, with significant accuracy improvements under moderate canopy and between buildings, as well as yield increases in many cases.

Fairly conservative thresholds were used for this prototype system. The conservative thresholds were selected to favor accuracy and robustness instead of pure yield. Thus, the yield increases were not as impressive as they could have been in many cases. If very high accuracy is required, a post-correction selection of the best positions (i.e. the extra 'pruning' described earlier) can be performed by analyzing post-correction covariance and error ellipses. Using the settings described earlier, this increases accuracy (to good quality code GPS levels) at the cost of yield, with yield increases typically limited to 10-20% instead of the dramatic increases otherwise possible. In practice, it may be advantageous to allow the changing of the various thresholds during processing, so that the user can choose their desired balance between yield and accuracy. It may also be worthwhile to introduce post-processing covariance analysis using the error ellipses into standard MCORR (or the next generation engine) as another adjustable correction mask.

The differences in performance between the bias and three-state algorithms were minimal, in terms of horizontal GPS accuracy and yield, with the three-state algorithm generally slightly better. With the better velocity modeling (include Doppler measurements), it produced smoother estimates on its own, so it became unnecessary to filter the raw sensor data for noise. This allowed a single three-state filter scheme rather than two two-state filters, simplifying the architecture somewhat. The three-state model also converged faster initially, decreasing start up initialization time. The differential algorithm did not perform well. The results from the differential algorithm are unsurprisingly inferior, despite the increase complexity required to make the algorithm even work, due to the inaccurate modeling of the processes involved.

Unless special requirements demand otherwise, the three-state filter algorithm is preferable.

The post-processing only backward-smoothing filter also performed reasonably well. It reduced error estimates, extended the useful duration of the altimeter, and reduced the effect of bias drift during outages due to its interpolating nature. These benefits were more pronounced during longer outages. The smoothing quality also produced better altitude transitions between good GPS times and outages, with errors at the end of outages generally improved. It was still somewhat vulnerable to bad calibrations however, in that if a bad calibration occurs just prior to and/or after an outage, the output can tend to be shifted from the truth. The effect of this is generally minor (and may be improved with better GPS error detection schemes), so if post-processing is available, backward-smoothing is highly recommended, especially for the bias filter algorithm.

As comparisons with the existing Auto 2-D/3-D solutions showed, a flat ground assumption is valid in many cases. In good weather, with low barometric pressure drift, the actual accuracy of the barometer often proved to be better than the worst case assumption that is used for the integration algorithm. It is not surprising then, that the drift tolerance feature in the barometric correction algorithm was also able to increase yield in flat terrain environments.

Mixed results were obtained from the receiver clock error constraint.

Although it allowed two-satellite navigation to a reasonable level of accuracy for the GeoXH receiver, it required the barometric altitude constraint to produce reasonable positions. Those positions typically had errors within 3 m. With any more than two satellites, positions became much more inaccurate (by a hundred meters in cases) due to the effect of clock error on all pseudo range measurements. By itself, the clock error constraint is unusable, often producing positions that are off by thousands of meters. It is rarely useful, generally producing only a 1-3% increase in yield while still remaining reasonable in terms of accuracy.

Brief results from the differential barometry experiments showed extremely good results. By using a local base station logging barometric correction data in parallel with the rover, the barometric constraint can be essentially be used for an entire data collection session provided some very good GPS conditions are available initially. This eliminates the need to calibrate using anything except extremely good GPS measurements. Although the resulting positions will still tend to scatter in bad conditions (low precision), accuracy is improved (statistically speaking). With averaging or smoothing (i.e. with point features), sub-meter accuracy is achievable even in canopy. Comparisons between two difference reference stations show that for maximum accuracy, the reference should be as close as possible to the data collection site.

The barometric altitude errors from within an enclosed moving vehicle were generally limited to 2 m, and did not have a significant effect on horizontal accuracy in the context of code processing. With open windows however, the effects are rather disastrous. The ascent and descent rate limiting solution devised reduced the problem to manageable levels (i.e. about 2 m of vertical error), and will probably ensure that data collected from a motor vehicle remains usable. If strict accuracy is required however, using the system in a highly dynamic environment such as a vehicle is not recommended.

For the most part, the prototype faired well. The SCP1000 is a fairly good sensor for the application, being self-contained, (with its own I$^2$C/SPI port), reasonably cheap, accurate, and with internal temperature compensation.

Its relative accuracy is probably greater than required, given the limitations of GPS pseudo range accuracy. A slightly less accurate, cheaper sensor may be able to deliver similar horizontal accuracy in similar circumstances. In moderate conditions (e.g. light drizzle, small breeze), relative accuracy and noise levels were more than sufficient for code correction, with GPS measurements being comparable or worse. It is unknown how well the system would cope in more severe weather conditions however. In general, it appeared that the barometric altitude constraint was better able to compensate for bad geometry than for bad measurements. Horizontal errors were generally more affected by bad quality pseudo ranges than by the altitude constraint, with vertical errors of under 2 m having little or no effect on horizontal accuracy. In extremely bad conditions however, the improvement in vertical accuracy due to the altitude constraint may actually make the horizontal errors worse due to the dominance of bad GPS measurements (averaging may help somewhat in these cases). Thus, further efforts to improve rover only altitude estimation are not likely to improve horizontal accuracy unless base GPS accuracy can be improved.

The prototype also showed potential improvements in the area of post-processing. Since barometric altitude bias drift tends to be a steady, long term effect, the ability to backward-smooth and interpolate allows barometric altitude constraints over very long poor spots. Thus it is worthwhile to allow barometric data to be formally logged into SSF format for post-processing. It also showed the benefits of the Kalman filter for future correction engines. With its ability to combine multiple sources of information optimally and give sensible error estimates, a single Kalman filter integrating GPS position and Doppler information with backward-smoothing capability offers significant advantages over the current MCORR engine.

The above discussion has set forth the operation of various exemplary systems and devices, as well as various embodiments pertaining to exemplary methods of operating such systems and devices. In various embodiments, one or more steps of a method of implementation are carried out by a processor under the control of computer-readable and computer-executable instructions. Thus, in some embodiments, these methods are implemented via a computer.

Overall, the results gathered from the prototype showed that significant benefits can be gained from an integrated real-time, barometrically aided GPS system in moderately bad environments. Substantial increases in yield are possible at very little cost to accuracy. By filtering during post-processing, even greater benefits can be gained through backward-smoothing. For typical data collection settings on foot, in moderate weather conditions, the prototype system produces very reliable meter-level accuracy results using the GeoXH.

Differential barometry has the potential to maximize the effectiveness of the barometric constraint, allowing use for entire data collection sessions.

In an embodiment, the computer-readable and computer-executable instructions may reside on computer useable/readable media.

Therefore, one or more operations of various embodiments may be controlled or implemented using computer-executable instructions, such as program modules, being executed by a computer. Generally, program modules include routines, programs, positioning devices, components, data structures, etc., that perform particular tasks or implement particular abstract data types. In addition, the present technology may also be practiced in distributed computing environments where tasks are performed by remote processing devices that are linked through a communications network. In a distributed computing environment, program modules may be located in both local and remote computer-storage media including memory-storage devices.

Although specific steps of exemplary methods of implementation are disclosed herein, these steps are examples of steps that may be performed in accordance with various exemplary embodiments. That is, embodiments disclosed herein are well suited to performing various other steps or variations of the steps recited. Moreover, the steps disclosed herein may be performed in an order different than presented, and not all of the steps are necessarily performed in a particular embodiment.

Although various electronic and software based systems are discussed herein, these systems are merely examples of environments that might be utilized, and are not intended to suggest any limitation as to the scope of use or functionality of the present technology. Neither should such systems be interpreted as having any dependency or relation to any one or combination of components or functions illustrated in the disclosed examples.

Although the subject matter has been described in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A method of improving accuracy of position coordinates of a positioning device comprising:
   (A) obtaining a 3D reference solution for reference position coordinates of said positioning device by using a plurality of available radio signals emanating from an integer N number of available radio sources at time t; wherein said 3D solution includes a reference 3D altitude of said positioning device at Epoch (t);
   (B) obtaining a barometric altitude of said positioning device at each Epoch;
   (B4) detecting Epoch (t*) at which a trigger event occurs;
   (C) if a trigger event occurs at Epoch (t*)=Trigger Epoch (t+1), generating an updated altitude of said positioning device at said Epoch (t+1) by using said reference 3D altitude obtained at said Epoch (t) and by using said barometric altitude obtained at said Epoch (t) and obtained at said Epoch (t+1); and
   (D) using a position estimator to obtain 3D solution for position coordinates of said positioning device at said Epoch (t+1) with improved accuracy by utilizing said updated altitude of said positioning device.

2. The method of claim 1, wherein said step (A) further comprises:
   (A1) selecting said integer N number of available radio sources from the
   group consisting of: {GPS; GLONASS; combined GPS/GLONASS; GALILEO; and COMPASS}.

3. The method of claim 1, wherein said step (B) further comprises:
   (B1) obtaining said baro measurement of said altitude of said positioning device at each Epoch by using a baro-sensitive device; wherein said baro-sensitive device is selected from the group consisting of: {a barometric altimeter; and a differential barometer}.

4. The method of claim 1, wherein said step (B) further comprises:
   (B2) obtaining a calibrated baro measurement of said altitude of said positioning device; wherein said 3D reference solution for reference position coordinates of said positioning device obtained by using said plurality of available radio signals is used to calibrate said baro measurement of said altitude of said positioning device obtained by said baro-sensitive device.

5. The method of claim 1, wherein said step (B) further comprises:
   (B3) obtaining said baro measurement of said altitude of said positioning device at each Epoch by using a differential barometer; wherein a fixed base station/receiver is equipped with a master baro-sensitive device; and wherein said master baro-sensitive device is configured to generate a set of differential baro corrections data; and wherein said differential barometer is configured to utilize said set of differential baro corrections data to generate a set of baro data for a substantially long period of time up to the whole data collection session.

6. The method of claim 3, wherein said step (B1) further comprises:
   (B1, 1) obtaining at least two consecutive barometric altitudes of said positioning device; wherein if a difference between said two consecutive barometric altitudes is greater than a predetermined threshold a new reference 3-D position is required before said barometric altitude is used to generate an updated altitude of said positioning device.

7. The method of claim 1, wherein said step (C) further comprises:
   (C1) selecting said trigger event from the group consisting of: {said integer number N of available radio sources is less than a predetermined number $N_{threshold}$; change in a constellation of available satellite radio sources; and a dilution of precision (DOP) is greater than a predetermined threshold $DOP_{threshold}$}.

8. The method of claim 7, wherein said step (C1) further comprises:
   (C1, 1) selecting said DOP from the group consisting of: {a vertical dilution of precision (VDOP); a positional dilution of precision (3D) (PDOP); a temporal dilution of precision (TDOP); and combination of said VDOP, PDOP, and TDOP}.

9. The method of claim 7, wherein said step (C1) further comprises:
   (C1, 2) if said number N of available satellite radio sources is less than $N_{threshold\_satellites}$, using said baro measurement of said altitude of said positioning device and a plurality of radio signals emanating from an available plurality of radio sources to obtain position coordinates at said Epoch (t+1) for an updatable positioning device.

10. The method of claim 7, wherein said step (C1) further comprises:
    (C1, 3) if said dilution of precision (DOP) is greater than a heuristics threshold $DOP_{threshold\_heuristics}$, using said baro measurement of said altitude of said positioning device and a plurality of radio signals emanating from an available plurality of radio sources to obtain position coordinates at said Epoch (t+1) for an updatable positioning device.

11. The method of claim 1, wherein said step (D) further comprises:
    (D1) implementing said position estimator by using a Bias Filter Model; wherein said position estimator utilizes an altitude sensor Kalman filter and a bias master Kalman filter; and wherein each new altitude is used to update and project said altitude Kalman filter; and wherein said bias Kalman filter is projected to provide a continuous estimate of said barometric altitude bias.

12. The method of claim 1, wherein said step (D) further comprises:
- (D2) implementing said position estimator by using a Differential Filter Model; wherein barometric altitude is used as a differential altimeter; and wherein pseudo derivative of barometric altitude is calculated and injected into a master Kalman filter as a rate measurement.

13. The method of claim 1, wherein said step (D) further comprises:
- (D3) implementing said position estimator by using a Three-State Altitude Filter Model; wherein said position estimator utilizes a combined altitude and velocity three-state Kalman filter.

14. The method of claim 1, wherein said step (D) further comprises:
- (D4) implementing said position estimator by using backward-smoothing of filter estimates.

15. The method of claim 1, wherein said step (D) further comprises:
- (D5) implementing said position estimator in post-processing situations by using backward-smoothing of filter estimates; wherein said backward-smoothing is implemented by using a Fraser & Potter algorithm.

16. The method of claim 1, wherein said step (D) further comprises:
- (D6) implementing said position estimator in post-processing situations by using backward-smoothing of filter estimates; wherein said backward-smoothing is implemented by using a Rauch, Tung, & Striebel (RTS) algorithm.

17. The method of claim 16, wherein said step (D6) further comprises:
- (D6, 1) extending the amount of time when said barometric altitude measurements are usable without a reference 3D position by processing a set of available measurement data in both a forward and backward direction in time.

18. The method of claim 1, wherein said step (D) further comprises:
- (D7) implementing said position estimator by using a Three-State Altitude Filter Model; wherein said position estimator utilizes a combined altitude and velocity three-state Kalman filter; wherein said plurality of available radio sources is configured to provide an absolute range reference and Doppler velocities, and wherein said set of differential baro corrections data is configured to provide an extra vertical velocity data.

19. A method of determining altitude of a positioning device comprising:
- (A) obtaining a reference altitude of a positioning device by using a plurality of available radio signals emanating from an integer N number of available radio sources at each Epoch (t);
- (B) obtaining a barometric altitude of said positioning device at each Epoch (t);
- (B2) detecting Epoch (t*) at which a trigger event occurs; and
- (C) if a trigger event occurs at Epoch (t*)=Trigger Epoch (t+1), generating an updated altitude of said positioning device at said Epoch (t+1) by using said reference altitude obtained at said Epoch (t) and by using said barometric altitude obtained at said Epoch (t) and obtained at said Epoch (t+1).

20. The method of claim 19, wherein said step (B) further comprises:
- (B1) updating a barometric altitude of said positioning device at a plurality of updatable Epochs; wherein said selection of said plurality of updatable Epochs depends on the path of said positioning device.

21. The method of claim 20, wherein said step (B1) further comprises:
- (B1, 1) if said path of said positioning device is horizontal, updating said barometric altitude of said positioning device at a predetermined plurality of updatable Epochs.

22. The method of claim 19, wherein said step (C) further comprises:
- (C1) stopping using said barometric altitude obtained at said Epoch (t) and obtained at said Epoch (t+1) until a new reference altitude solution is obtained if the uncertainty in error of said barometric altitude is greater than a first predetermined threshold.

23. The method of claim 19, wherein said step (C) further comprises:
- (C2) extending the usage of said barometric altitude obtained at said Epoch (t) and obtained at said Epoch (t+1) if said positioning device is moving on flat ground even if the uncertainty in error of said barometric altitude is greater than said first predetermined threshold but less than a second predetermined threshold.

24. An apparatus for improving accuracy of position coordinates of a positioning device comprising:
- (A) a means for obtaining a 3D reference solution for reference position coordinates of said positioning device by using a plurality of available radio signals emanating from an integer N number of available radio sources at time t; wherein said 3D solution includes a reference 3D altitude of said positioning device at Epoch (t);
- (B) a means for obtaining a barometric altitude of said positioning device at each Epoch;
- (B2) a means of detecting Epoch (t*) at which a trigger event occurs;
- (C) a means for detecting a trigger event at Epoch (t*) =TriggerEpoch (t+1);
- (C2) a means for generation of an updated altitude of said positioning device at said Epoch (t+1); and
- (D) a means for obtaining a 3D solution for position coordinates of said positioning device at said Epoch (t+1) with improved accuracy by utilizing said updated altitude of said positioning device.

25. The apparatus of claim 24, wherein said means (A) further comprises:
- (A1) a radio receiver selected from the group consisting of: {a GPS radio receiver; a GLONASS radio receiver; combined a GPS/GLONASS radio receiver; a GALILEO radio receiver; and a COMPASS radio receiver}.

26. The apparatus of claim 24, wherein said means (B) further comprises:
- (B1) a baro-sensitive device selected from the group consisting of: {a barometric altimeter; and a differential barometer}.

27. The apparatus of claim 24, wherein said means (C) further comprises:
- (C1) a radio receiver configured to detect said trigger event selected from the group consisting of: {said integer number N of available radio sources is less than a predetermined number $N_{threshold}$; change in a constellation of available satellite radio sources; and a dilution of precision (DOP) is greater than a predetermined threshold $DOP_{threshold}$}.

28. The apparatus of claim 24, wherein said means (D) further comprises:
- (D1) a position estimator configured to implement a Bias Filter Model; wherein said position estimator utilizes an altitude sensor Kalman filter and a bias master Kalman filter; and wherein each new altitude is used to update and project said altitude Kalman filter; and wherein said bias Kalman filter is projected to provide a continuous estimate of said barometric altitude bias.

29. The apparatus of claim 24, wherein said means (D) further comprises:
(D2) a position estimator configured to implement a Differential Filter Model; wherein a barometric altitude is used as a differential altimeter; and wherein a pseudo derivative of said barometric altitude is calculated and injected into a master Kalman filter as a rate measurement.

30. The apparatus of claim 24, wherein said means (D) further comprises:
(D3) a position estimator configured to implement a Three-State Altitude Filter Model; wherein said position estimator utilizes a combined altitude and velocity three-state Kalman filter.

31. The apparatus of claim 24, wherein said means (D) further comprises:
(D4) a position estimator configured to implement a backward-smoothing filter.

32. The apparatus of claim 24, wherein said means (D) further comprises:
(D5) a position estimator configured to implement a backward-smoothing filter by using a Fraser & Potter algorithm.

33. The apparatus of claim 24, wherein said means (D) further comprises:
(D6) a position estimator configured to implement a backward-smoothing filter by using a Rauch, Tung, and Striebel (RTS) algorithm.

34. The apparatus of claim 24, wherein said means (D) further comprises:
(D7) a position estimator configured to implement a Three-State Altitude Filter Model; wherein said position estimator utilizes a combined altitude and velocity three-state Kalman filter; wherein said plurality of available radio sources is configured to provide an absolute range reference and Doppler velocities, and wherein said set of differential baro corrections data is configured to provide an extra vertical velocity data.

35. A computer program product that includes a computer readable medium having a sequence of instructions which, when executed by a processor, causes the processor to execute a process for improving accuracy of position coordinates of a positioning device; the process comprising:
(A) obtaining a 3D reference solution for reference position coordinates of said positioning device by using a plurality of available radio signals emanating from an integer N number of available radio sources at time t; wherein said 3D solution includes a reference 3D altitude of said positioning device at Epoch (t);
(B) obtaining a barometric altitude of said positioning device at each Epoch;
(B1) detecting Epoch (t*) at which a trigger event occurs;
(C) if a trigger event occurs at Epoch (t*)=TriggerEpoch (t+1), generating an updated altitude of said positioning device at said Epoch (t+1) by using said reference 3D altitude obtained at said Epoch (t) and by using said barometric altitude obtained at said Epoch (t) and obtained at said Epoch (t+1);
and
(D) using a position estimator to obtain 3D solution for position coordinates of said positioning device at said Epoch (t+1) with improved accuracy by utilizing said updated altitude of said positioning device.

* * * * *